US008509095B2

(12) United States Patent
Ormazabal

(10) Patent No.: US 8,509,095 B2
(45) Date of Patent: *Aug. 13, 2013

(54) METHODOLOGY FOR MEASUREMENTS AND ANALYSIS OF PROTOCOL CONFORMANCE, PERFORMANCE AND SCALABILITY OF STATEFUL BORDER GATEWAYS

(75) Inventor: Gaston S. Ormazabal, New York, NY (US)

(73) Assignee: Verizon Services Corp., Ashburn, VA (US)

( * ) Notice: Subject to any disclaimer, the term of this patent is extended or adjusted under 35 U.S.C. 154(b) by 379 days.

This patent is subject to a terminal disclaimer.

(21) Appl. No.: 12/791,950

(22) Filed: Jun. 2, 2010

(65) Prior Publication Data
US 2010/0238810 A1 Sep. 23, 2010

Related U.S. Application Data

(63) Continuation of application No. 11/453,877, filed on Jun. 16, 2006, now Pat. No. 7,886,350, which is a continuation-in-part of application No. 11/093,699, filed on Mar. 30, 2005, now Pat. No. 7,853,996, and a continuation-in-part of application No. 10/679,222, filed on Oct. 3, 2003, now Pat. No. 7,886,348, and a continuation-in-part of application No. 10/678,779, filed on Oct. 3, 2003, now Pat. No. 7,076,393, and a continuation-in-part of application No. 10/678,328, filed on Oct. 3, 2003, now Pat. No. 7,421,734.

(51) Int. Cl.
*H04L 12/26* (2006.01)

(52) U.S. Cl.
USPC .............................. 370/242; 726/11

(58) Field of Classification Search
USPC .................... 370/242, 244; 726/11
See application file for complete search history.

(56) References Cited

U.S. PATENT DOCUMENTS 5,414,704 A 5/1995 Spinney
5,465,286 A 11/1995 Clare et al.
(Continued)

OTHER PUBLICATIONS

Kuthan, et al., "Middlebox Communication: Framework and Requirements—Internet Draft," Internet Engineering Task Force (IETF), http://tools.ietf.org/html/draft-kuthan-midcom-framework-00, 26 pages, Internet Engineering Task Force, Nov. 2000.

(Continued)

*Primary Examiner* — Brian D Nguyen

(57) ABSTRACT

Testing of Internet-Protocol packet network perimeter protection devices, e.g., Border Gateways such as Session Border Controllers, including dynamic pinhole capable firewalls are discussed. Analysis and testing of these network perimeter protection devices is performed to evaluate the ability of such device to perform at carrier class levels while being subjected to many different protocol test cases. The efficiency of state look table functions as well as call signaling processing capacity, implemented in a particular perimeter protection device, are determined and evaluated. Proper performance and efficiency of such perimeter protection devices are evaluated as a function of: incoming call rate, total pre-existing active calls, and different protocol test cases. Various different network perimeter protection devices, e.g., of different types and/or from different manufactures, can be benchmarked for degree of protocol stack implementation/suitability to carrier class environments and comparatively evaluated. Test equipment devices, e.g., Integrated Intelligent End Points (IIEPs), for fault testing, evaluating and stressing the network perimeter protection devices in a system environment are described. Typically these specialized test devices are used in pairs, one on each side of the firewall under test. These test equipment devices include a traffic generator module, a protocol compliance testing module, monitoring and analysis capability including a CPU utilization analysis module, a protocol analysis module, and a graphical output capability.

20 Claims, 12 Drawing Sheets

(56) References Cited

U.S. PATENT DOCUMENTS

| | | | |
|---|---|---|---|
| 5,473,607 A | 12/1995 | Hausman et al. | |
| 5,828,653 A | 10/1998 | Goss | |
| 5,859,980 A | 1/1999 | Kalkunte | |
| 5,909,686 A | 6/1999 | Muller et al. | |
| 5,936,962 A | 8/1999 | Haddock et al. | |
| 5,991,270 A | 11/1999 | Zwan et al. | |
| 6,154,775 A | 11/2000 | Coss et al. | |
| 6,175,902 B1 | 1/2001 | Runaldue et al. | |
| 6,680,089 B2 | 1/2004 | Miyake et al. | |
| 6,701,346 B1 | 3/2004 | Klein | |
| 6,707,817 B1 | 3/2004 | Kadambi et al. | |
| 6,816,910 B1 * | 11/2004 | Ricciulli | 709/237 |
| 6,826,616 B2 | 11/2004 | Larson et al. | |
| 6,880,089 B1 | 4/2005 | Bommareddy et al. | |
| 6,920,107 B1 | 7/2005 | Qureshi et al. | |
| 6,930,598 B2 * | 8/2005 | Weiss | 340/531 |
| 6,934,756 B2 | 8/2005 | Maes | |
| 7,007,299 B2 | 2/2006 | Ioele et al. | |
| 7,072,291 B1 | 7/2006 | Jagadeesan et al. | |
| 7,076,393 B2 | 7/2006 | Ormazabal et al. | |
| 7,254,832 B1 | 8/2007 | Christie | |
| 7,340,166 B1 | 3/2008 | Sylvester et al. | |
| 7,385,927 B2 * | 6/2008 | Gygi et al. | 370/242 |
| 7,385,931 B2 * | 6/2008 | Magnaghi et al. | 370/248 |
| 7,421,734 B2 | 9/2008 | Ormazabal et al. | |
| 7,440,573 B2 | 10/2008 | Lor et al. | |
| 7,499,405 B2 | 3/2009 | Gilfix et al. | |
| 7,634,249 B2 | 12/2009 | Hahn et al. | |
| 7,653,938 B1 | 1/2010 | Touitou et al. | |
| 7,672,336 B2 | 3/2010 | Bharrat et al. | |
| 7,716,725 B2 | 5/2010 | Xie | |
| 7,721,091 B2 | 5/2010 | Iyengar et al. | |
| 2002/0083187 A1 | 6/2002 | Sim et al. | |
| 2002/0112073 A1 | 8/2002 | MeLampy et al. | |
| 2003/0055931 A1 | 3/2003 | Cravo De Almeida et al. | |
| 2003/0076780 A1 | 4/2003 | Loge et al. | |
| 2003/0086425 A1 | 5/2003 | Bearden et al. | |
| 2003/0093562 A1 | 5/2003 | Padala | |
| 2003/0093563 A1 | 5/2003 | Young et al. | |
| 2003/0115321 A1 | 6/2003 | Edmison et al. | |
| 2003/0117961 A1 * | 6/2003 | Chuah et al. | 370/242 |
| 2003/0126464 A1 | 7/2003 | McDaniel et al. | |
| 2003/0135639 A1 | 7/2003 | Marejka et al. | |
| 2003/0165136 A1 | 9/2003 | Cornelius et al. | |
| 2003/0195861 A1 | 10/2003 | McClure et al. | |
| 2004/0001443 A1 * | 1/2004 | Soon et al. | 370/244 |
| 2004/0013086 A1 | 1/2004 | Simon et al. | |
| 2004/0028035 A1 | 2/2004 | Read | |
| 2004/0034793 A1 | 2/2004 | Yuan | |
| 2004/0039938 A1 | 2/2004 | Katz et al. | |
| 2004/0068668 A1 | 4/2004 | Lor et al. | |
| 2004/0128554 A1 | 7/2004 | Maher et al. | |
| 2004/0133772 A1 | 7/2004 | Render | |
| 2004/0136379 A1 | 7/2004 | Liao et al. | |
| 2004/0208186 A1 | 10/2004 | Eichen et al. | |
| 2004/0236966 A1 | 11/2004 | D'Souza et al. | |
| 2004/0244058 A1 | 12/2004 | Carlucci et al. | |
| 2004/0255156 A1 | 12/2004 | Chan et al. | |
| 2005/0018618 A1 | 1/2005 | Mualem et al. | |
| 2005/0050377 A1 | 3/2005 | Chan et al. | |
| 2005/0076235 A1 | 4/2005 | Ormazabal et al. | |
| 2005/0165917 A1 | 7/2005 | Le et al. | |
| 2005/0232229 A1 | 10/2005 | Miyamoto et al. | |
| 2006/0007868 A1 | 1/2006 | Shinomiya | |
| 2006/0075084 A1 | 4/2006 | Lyon | |
| 2006/0077981 A1 | 4/2006 | Rogers | |
| 2006/0146792 A1 | 7/2006 | Ramachandran et al. | |
| 2006/0227766 A1 | 10/2006 | Mickle et al. | |
| 2007/0022479 A1 | 1/2007 | Sikdar et al. | |
| 2007/0110053 A1 | 5/2007 | Soni et al. | |
| 2007/0118894 A1 | 5/2007 | Bhatia | |
| 2007/0121596 A1 | 5/2007 | Kurapati et al. | |
| 2007/0192863 A1 | 8/2007 | Kapoor et al. | |
| 2008/0037447 A1 | 2/2008 | Garg et al. | |
| 2008/0040801 A1 | 2/2008 | Buriano et al. | |

OTHER PUBLICATIONS

Rosenberg, et al., "SIP: Session initiation Protocol—RFC 3261," Network Working Group, The Internet Society, 269 pages, Jun. 2002.

* cited by examiner

| FIGURE 2A |
|---|
| FIGURE 2B |

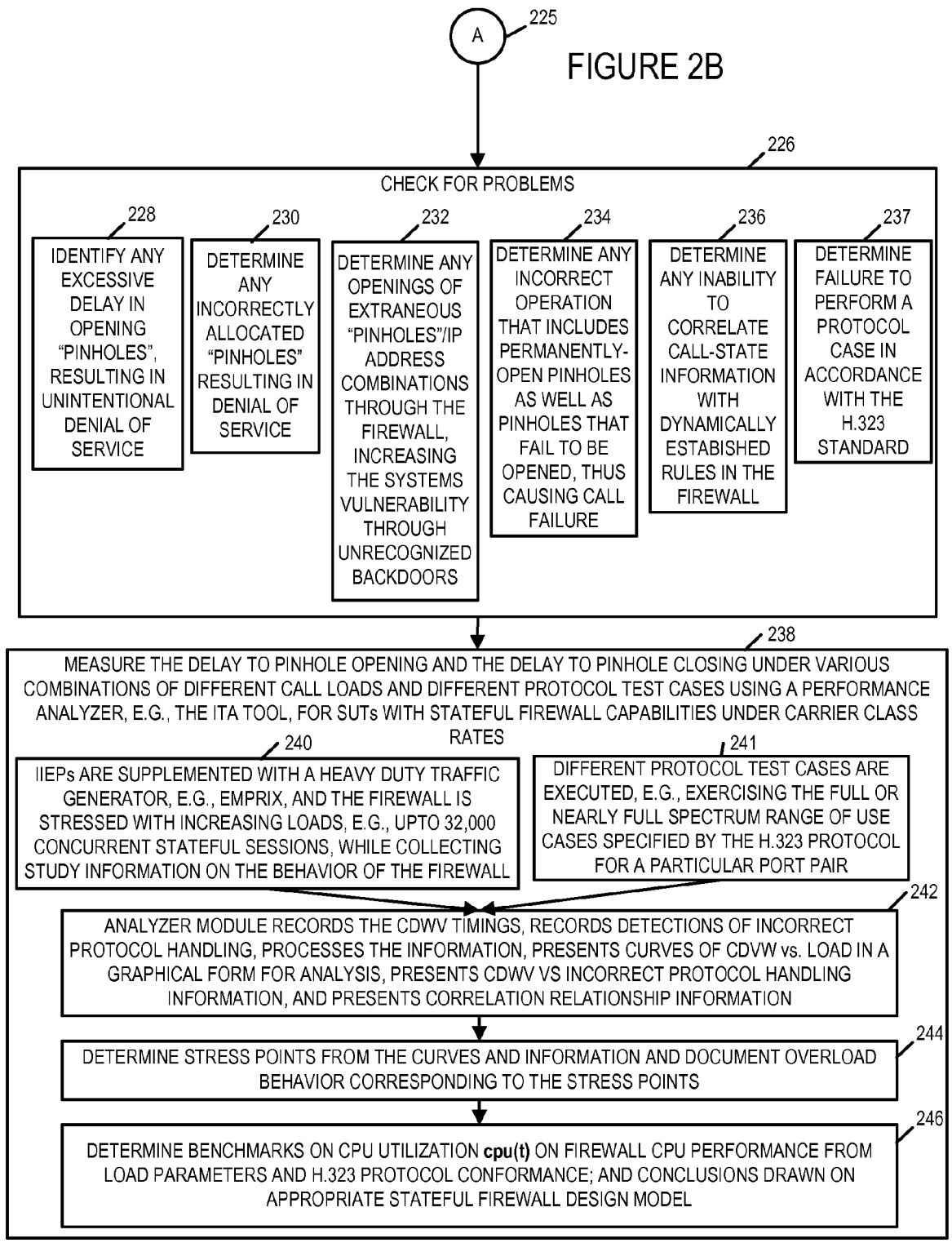

| FIGURE 3A |
|---|
| FIGURE 3B |

METHODOLOGY FOR MEASUREMENTS AND ANALYSIS OF PROTOCOL CONFORMANCE, PERFORMANCE AND SCALABILITY OF STATEFUL BORDER GATEWAYS

RELATED APPLICATIONS

The present application is a continuation of U.S. patent application Ser. No. 11/453,877, now U.S. Pat. No. 7,886,350, entitled "Methodology, Measurements And Analysis Of Performance And Scalability Of Stateful Border Gateways," filed on Jun. 16, 2006, which is: a continuation-in-part of U.S. patent application Ser. No. 11/093,699, now U.S. Pat. No. 7,853,996, entitled "Methodology, Measurements And Analysis Of Performance And Scalability Of Stateful Border Gateways," filed on Mar. 30, 2005, a continuation-in-part of U.S. patent application Ser. No. 10/679,222, now U.S. Pat. No. 7,886,348, entitled "Security Management System For Monitoring Firewall Operation," filed on Oct. 3, 2003, a continuation-in-part of U.S. patent application Ser. No. 10/678,779, now U.S. Pat. No. 7,076,393, entitled "Methods And Apparatus For Testing Dynamic Network Firewalls," filed on Oct. 3, 2003, and a continuation-in-part of U.S. patent application Ser. No. 10/678,328, now U.S. Pat. No. 7,421,734, entitled "Network Firewall Test Methods And Apparatus," filed on Oct. 3, 2003, each of which is hereby incorporated by reference.

BACKGROUND

Some local telecommunications service providers have begun programs for the delivery of advanced voice and data services over IP that will require the implementation of security measures in order to protect both the service providing network assets as well as the customer networks from service affecting malicious intrusions that can cause either network lodes or customer grievances. Additionally, the changing paradigm in the area if new services makes it beneficial for such a service provider to position its self ahead of it's competitors by being the first to offer the new services afforded by the transformation from a switch based network to an IP based network. Common to both of these efforts are the challenges that are faced by a large size telecommunications service provider namely the impact on scalability and performance.

Security and performance are typically a zero sum game since improved security often results in reduced throughput and performance. This is the case in the area of perimeter protection of customer and network assets as well as in the development of new multimedia and multi-technology services for millions of customers. These challenges are manifested most tellingly in the deployment of a "softswitch" infrastructure that will facilitate a telecommunication service provider achieving a position as "first to market" advanced services. Securing the softswitch assets from potential attack by a malicious intruder is a vitally important component to consider in future IP based networks and services. A security failure in this realm can be extremely costly to the telecommunication service provider both in real economic terms as well as in reputation. The security capability, however, should be implemented in a scalable manner.

Interconnection of large-scale IP networks presents new twists to security challenges that can benefit from added perimeter protection measures. Distinct from traditional data, broadband, Voice over Internet Protocol (VoIP) and multimedia services are interactive, utilize separate signaling and transport flows, and place unique Quality of Service (QoS) and security requirements on the network that take into account users and policies derived from signaling and downstream network topology. Carrier-to-carrier VoIP peering, Hosed IP Centex and other multimedia packet-based services present new challenges for IP networks and edge networking technologies. These services are to be delivered between different IP network "islands" traversing borders between carrier and customer and carrier-to-carrier often between private and public networks. Carriers are confronted with deployment barriers such as security, service level assurance and Network Address Translation (NAT) traversal. Layer 3 and 5 (application) security enhancements are difficult to implement, either because of the inherent very-distributed nature of VoIP networks (many hops), or because they involve the use of digital certificate-based key systems which are notoriously difficult to manage, especially, at the carrier class scale of a network of a typical local service provider's size. An alternative is to protect crucial network assets such as the softswitch infrastructure components, namely media gateways, signaling gateways, and application servers, through the use of network perimeter protection devices that will block potentially nefarious unwanted traffic from ever reaching those assets.

The network edge has evolved to be not only an access point but also a demarcation point and identifies the boundary of trust between the carrier's service network and its external customers and peers. The state of the art in VoIP security today is centered on the protection of these network "borders". These border devices, of necessity, need to implement firewall capabilities in both stateless and stateful modes thereby introducing new challenges for carrier class implementations, as stateful modes carry the burden of being extremely consumptive of CPU cycles for the devices performing the function.

In VoIP, the ports used to carry the media part of the call, are dynamically assigned through signaling, taken down upon call termination, and reused for a subsequent call at a later time. This technology is denominated "dynamic pinhole filtering" as firewalls need to filter traffic dynamically by opening/closing ports (pinholes) depending on the state and progress of a call. The correct implementation of this technology, at the network edge, provides indeed a good level of protection at a level of granularity not otherwise achievable with other current security technologies.

At least one service provider is currently involved in major projects that should involve the eventual deployment of this stateful capability of "dynamic pinhole filtering". Value Added Data Security Services (VADSS) may include such things as stateful pinhole filtering and the provisioning of VADSS capabilities to customers from a network's edge and can be provided as a value-added revenue generating service. Another application could involve the large scale deployment of a softswitch that will provide customers with hosted VoIP based services and advanced features. One of the possible devices considered for the security architecture of a softswitch infrastructure is a Session Border Controller (SBC). Such SBCs would include, as an important component, the capability of stateful packet filtering for the media streams. These SBCs with stateful packet filtering would be used in place of conventional devices that perform Network Address Translation (NAT) techniques, but do not include a dynamic filtering capability.

A major issue of concern associated with the testing of this dynamic stateful filtering capability, for both of these potential services, is the verification of its performance at the rates demanded by a carrier class network, namely Gigabit-Ethernet (GigE) interfaces with typical concurrent sessions of the order of up to 100K or higher. Methodology and the integrated tools to perform testing of stateful capable "dynamic pinhole filtering" for evaluating functional operation and performance of firewalls at carrier class traffic levels need to be developed.

Value Added Data Security Services will now be described. Value Added Data Security Services (VADSS) may be implemented as a suite of network-bases services that complement and add value to the basic capabilities of a local carrier's network-based IP-Virtual Private network (VPN) service and, represent a novel way of revenue generation. An exemplary VADSS service suite includes:

Virtualized firewall providing basic stateful firewall-customer-configurable rule sets for packet filtering, and full stateful firewall with dynamic pinhole filtering to protect customer assets from threats outside their network;

Internet Offload—an Internet access capability directly from the IP/MPLS infrastructure; and IPSec tunnel terminations.

The ability of VADSS to provide security services and Internet access from within a provider network is what distinguishes VADSS from similar offerings that depend on managed Customer Premise Equipment (CPE). By leveraging the economies of scale of platforms capable of running multiple instances of such applications as firewalls, a service provider can offer these virtualized services at the Service Edge Router level. Internet threats are kept at arm's length, away from the customer access link through network-based firewalls and address translation within the provider infrastructure. VADSS could include the provisioning of virtualized firewalls, each supporting a host of stateless protocols, as well as Application Layer Gateway capabilities for SIP, H.323, Skinny, and MGCP, at GigE rates and supporting 100K concurrent sessions.

Session Border Controllers for softwitch infrastructure will now be described. Existing edge functions such as aggregation, class based queuing and packet marking, address translation, security and admission control are insufficient to meet the requirements for the new softswitch based VoIP services. In addition to these traditional edge functions, VoIP and multimedia services present new requirements on the network edge including QoS and bandwidth theft protection, inter-working of incompatible signaling networks, lawful intercept, e.g., anonymous replication & forwarding of packets, and most significantly, the capability to perform stateful packet inspection, e.g., for voice streams, also called "dynamic packet filtering", at carrier-class rates. The service delivery network should be augmented with solutions that address these unique requirements. The existing edge router, complemented by an SBC, become the border element in the next generation network (NGN) architecture.

Session Border Controllers are a new category of network equipment designed to complement existing IP infrastructures, to deliver critical control functions to enable high quality interactive communications across IP infrastructures, to deliver critical control functions to enable high quality interactive communications across IP network borders. A "session" is any real-time, interactive voice, video or multimedia communication using IP session signaling protocols such as SIP, H.323, MGCP or Megaco/H.248. The "border" is any IP-IP network border such as those between service provider and customer/subscriber, or between two service providers. "Control" functions minimally include security and service assurance. Security functions provide access control and topology hiding at layers 3 and 5. Service assurance functions guarantee session capacity and control.

Security and address preservation features include network access control based on stateful packet inspection, with firewall dynamic pinholes created only for authorized media flows, and network topology hiding at both layer 3 and 5 via double network address and port translations. SBCs additionally protect softswitch, gatekeeper, gateway, application server, media server and other service infrastructure equipment from Denial of Service (DoS) attacks and overload with rate limiting of both signaling messages and media flows. SBCs simultaneously support SIP, MGCP and H.323 networks by actively participating in session signaling and can be controlled by a third part, multi-protocol softswitch, H.323 gatekeeper or MGCP call agent using a pre-standard MIDCOM protocol. The performance requirements for some typical SBCs in a carrier class environment typically range in the order of 5 GBps throughput with 100K concurrent sessions.

Strict verification of the correctness of a security implementation through testing, however, is of paramount importance as any defective implementation could result in windows of vulnerability that could be exploited by a malicious intruder to invade the very assets being protected. In the realm of security, a faulty implementation of a security device is doubly dangerous, as unnoticed backdoors that can be used for malicious intent, will contribute to a false sense of security. These windows of vulnerability can in turn be used by a malicious attacker for a Denial of Service attack, in the simplest case, up to a takeover of network assets that can be used to control and disrupt other parts of the network. The penalty associated with this security capability, however, is a considerable degradation in performance. The consequence of this performance degradation can result in two equally unappealing outcomes: (i) excessively long windows of vulnerability; and (ii) a self-inflicted Denial of Service attack as the underperforming device shuts out subsequent calls.

In view of the above discussion there is a need to properly benchmark and verify the performance of various firewall security devices. Methods and apparatus that will permit a quantification of functionality and performance at carrier-class scales under a variety of signaling conditions and scenarios in addition to different amounts of loading would be especially beneficial.

Stateful packet filtering, performed in firewall security devices, is a very consumptive process in terms of both memory and CPU utilization. Known approaches to benchmarking and verifying the performance of various firewall security devices have not adequately addressed the need to test the level of depth to which a given firewall security device vendor has implemented a particular protocol suite or the effect that different amounts of loading may have on a particular firewall's ability to remain compliant with the wide range of features/signaling possibilities which are possible for a given communications protocol. Firewall compliance with a particular protocol may depend on how a stack, e.g., a SIP or a H.323 protocol stack, used for processing the signals, e.g., session establishment, termination and error handling signaling, is implemented. Often vendors attempt to implement a simplified protocol stack which handles the majority of expected signaling cases but may be less then fully compliant or are implemented in such a manner that particular signaling sceneries will result in firewall failures sooner than other scenarios under a particular signal processing, e.g., SIP signaling, load.

As can be appreciated, it is desirable to be able to detect vendor implementations that may be less than fully conformant with a protocol to be supported, e.g., the complete SIP and/or the complete H.323 protocol, or which will fail for less common signaling scenarios, e.g., incomplete calls or lost signals, under particular loading conditions.

It can be important that a user of a firewall be able to predicate when the firewall will encounter situations when signals, e.g., SIP or other signals relating to calls, cannot be handled at all, or when events midstream will not be detected, thus creating additional possibilities of leaving long windows of vulnerability open. For example, a vendor's streamlined protocol implementation may have left out less frequently occurring use cases or be able to support very limited numbers of such cases. As a result, a firewall device may be unable to handle some functions, thus throttling calls midstream by not opening the pinholes or leaving calls unprocessed midway with a corresponding pinhole window of vulnerability. One reason why vendors choose to implement these reduced version protocols is because loading the full protocol stack, with the CPUs typically found in current routers and/or conventional firewall blades, tends to adversely affect other functions of the device, as the CPU shares memory and cycles with other functionalities such as, e.g., packet processing, table searches, and filtering. The issue of CPU utilization by competing simultaneous needs, continues to vex the designers of these firewall security devices, and they will frequently choose to streamline their protocol implementations in order to satisfy the competing demands of call processing (call signaling) with those of state keeping and table look-ups to effect the filtering function.

Thus, it should be appreciated that competing demands can result in a vendor's firewall protection device operating well with regard to one set of circumstances, e.g., normal successful call set up and completion, but operating poorly with regard to another set of circumstances, e.g., where sessions such as calls are terminated prior to normal completion or some session control signals are lost during communication, e.g., to interference and or other communication problems such as excessive network delays.

In general, the slimmer the version of the reduced protocol stack that a vendor implements, the faster the call processing time will be. Thus some vendors decide to intentionally not implement some of the complete protocol stack, e.g., related to functions deemed by the vendor to be non-essential, in order to achieve better call processing characteristics for their device and gain a competitive marketing advantage. However, such tradeoff decisions by a vendor can result in undesirable side effects concerning windows of vulnerability of dynamic pinholes and thus compromise the security of the firewall device under certain conditions. Unfortunately, the vendor may not be aware of the implications of particular design choices under loading conditions corresponding to different protocol features and/or signaling sceneries such as where a session is terminated prematurely or without the expected signaling.

Notably, even in applications where a vendor has attempted to implement a full version of the complete protocol stack in their firewall security device, e.g., a firewall control proxy, it would still be beneficial if methods and apparatus were developed to provide verification that the protocol support, as implemented by the vendor, and the firewall security device hosting the vendor protocol implementation, conform to requirements and conform to advertised specifications under test conditions exercising the full range of protocol features and signaling scenarios which may be encountered. In addition, methods and apparatus that measure and/or benchmark comparative performance with respect to other alternative firewall security devices, e.g., offered by other vendors, would be beneficial. It would be advantageous if such methods and apparatus considered windows of vulnerability of dynamic pinholes.

Based on the above discussion it is apparent that there is a need for methods and apparatus for benchmarking and verifying the performance and/or compliance of various firewall security devices in view of the knowledge that a vendor's protocol stack implementation can be a factor in adversely impacting firewall security including the timely closing of dynamic pinholes. Methods and apparatus that fully or nearly full exercise the full set of protocol features and signaling possibilities, when testing a vendor's firewall security device and monitoring its dynamic pinhole operation characteristics, could provide insight when evaluating and benchmarking such a device. It can also be used to identify particular signaling sceneries which can cause a firewall to fail and may be used to predict the amount of loading at which a failure will occur which might not occur under less stressful, in terms of loading, conditions.

BRIEF DESCRIPTION OF THE FIGURES

FIG. 2B is a flowchart of an exemplary method of testing and evaluating the vulnerability and performance of network perimeter protection devices; the method is directed toward SIP or a similar protocol.

DETAILED DESCRIPTION OF PREFERRED EMBODIMENTS

Figure 1:
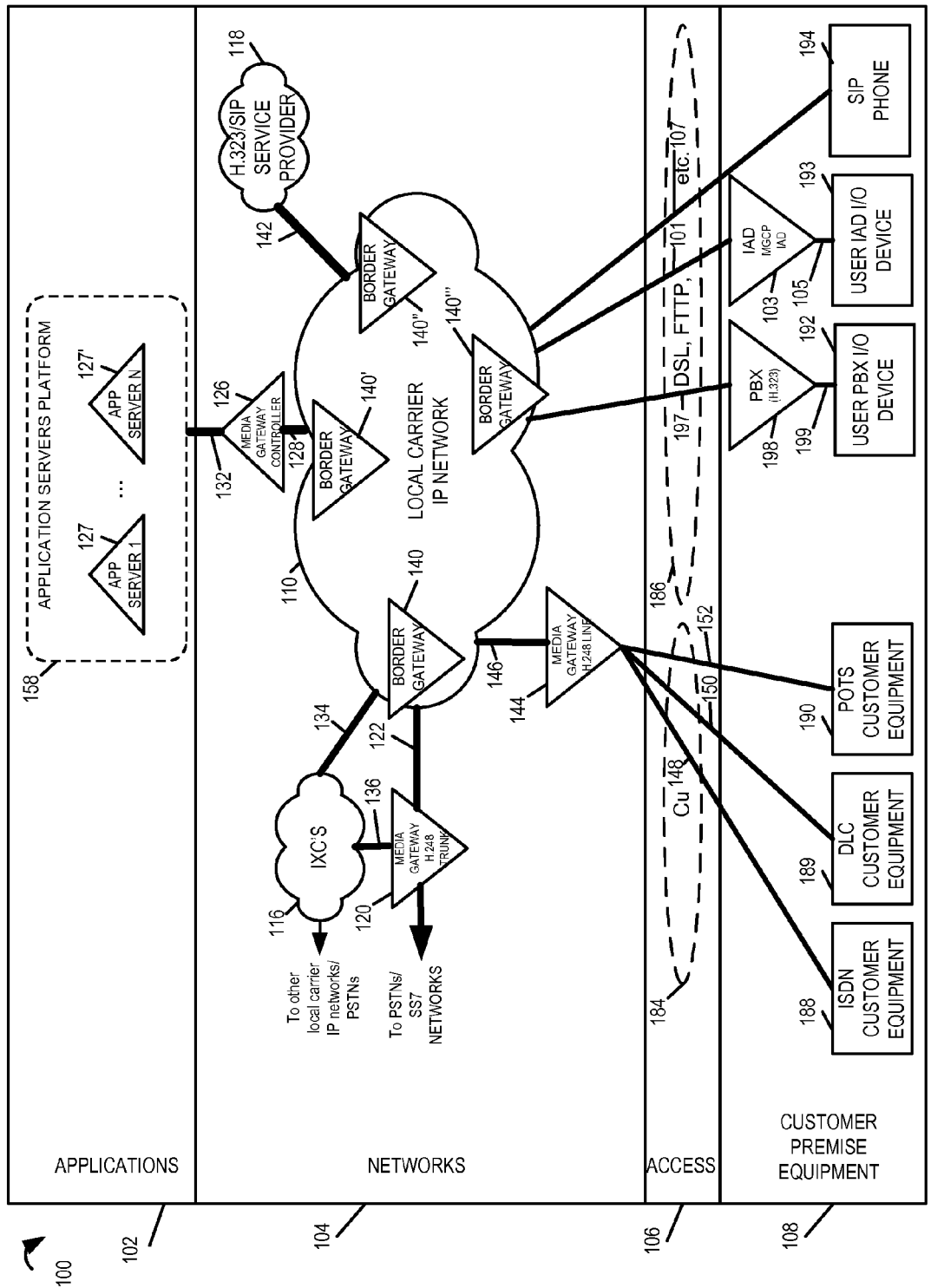
FIG. 1 is a drawing illustrating an exemplary softswitch structure and topology in a communications system including network edge security devices including firewalls which may be tested in accordance with the methods and apparatus of the present invention.

FIG. 1 is a drawing illustrating an exemplary softswitch infrastructure and topology in an exemplary communications system 100. Exemplary system 100 includes applications infrastructure 102, networks infrastructure 104, access infrastructure 106, and customer premise facilities infrastructure 108.

The networks infrastructure 104 includes a local carrier Internet Protocol (IP) network 110, IntereXchange Carrier (IXC) networks 116, an H.323 and/or SIP service provider network 118, media gateway controller 126, media gateway 120, and media gateway 144.

Local carrier IP network 110 is an IP network providing connectivity and functionality for the delivery of advanced voice and data services over IP by the local service provider. The local carrier IP network 110 includes a plurality of border gateways (140, 140' 140", 140''') serving as perimeter protection devices for local carrier IP network 110.

Media gateway 120, e.g., a Packet Voice Gateway (PVG) such as a H.248 trunk gateway, is situated between local carrier IP network 110 and Public Switched Telephone Networks (PSTNs)/SS7 networks. Link 122 couples the local carrier IP network 110 to media gateway 120. In some embodiments, the PSTN/SS7 network coupled to media gateway 120 is owned and/or operated by the same service provider as local carrier IP network 110. A media gateway controller (MGC) 126, e.g., a VoIP Call Manager, is coupled to the local carrier IP network 110 via link 128; the MGC 126 is also coupled to an Applications Server Platform 158 via link 132.

IXCs 116, e.g., long distance carriers, are coupled to local carrier IP network 110 via link 134 and to media gateway 120 via link 136. The IXCs 116 may be coupled to other local carrier IP networks and/or other PSTNs providing connectivity between local carrier IP network 110 to other local networks, of the same or a different service provider. IXC networks 116 may comprise networks such as IP networks and/or SS7 networks.

A plurality of border gateways (140, 140', 140", 140'''), operating on the edge or perimeter of network 110, provide firewall protection between the interior of local carrier IP network 110 and various external networks, service providers, media gateways, application servers, and/or customer premises. Border gateways 140, 140', 140", 140''' may be implemented as Session Border Controllers (SBCs), and may include a firewall including stateful capable dynamic pinhole filtering. Border gateway 140 couples media gateway 120, media gateway 144, and IXCs 116 through its firewall to the interior of IP network 110. Border gateway 140' couples media gateway controller 126 through its firewall to the interior of IP network 110. Border gateway 140" couples H.323/SIP service provider network 118 through its firewall to the interior of IP network 110. Border gateway 140''' couples various customer premise equipment 191, 198, 103, 194 through its firewall to the interior of IP network 110. In general the number and types of border gateways used in local carrier IP network 110 may vary depending upon loading considerations, interconnectivity requirements, and the size of the network 110. In addition, a single given border gateway need not be, and in many cases is not, restricted to interfacing to a single type or class of external network or device. For example, in some embodiments, the same border gateway which interfaces to a H.323/SIP service provider network may also interface to customer premise equipment.

The H.323/SIP service provider network 118 performs Value Added Data Security Services (VADSS) for provisioned customers. Some of these value added services may include VoIP services and advanced features such as dynamic pinhole filtering for the customer premises protection. One or more of border gateways 140, 140', 140", 140''' which provide a more secure alternative to a NAT device, include a stateful capability of "dynamic pinhole filtering". The VADSS can provision available capabilities to customers from the local carrier IP network 110 edge, e.g., providing a more secure linkage to value-added services and billing for access to those services. In some embodiments, some value added services are included as part of the border gateway 140, 140', 140", 140''', allowing the local carrier to receive revenue for those local network sourced value added services. The stateful modes of operation employed in border gateway 140, 140', 140", 140''' are extremely consumptive of CPU cycles for performing its functions. Preferred embodiments described herein implement testing systems and methods for verifying the performance of border gateways 140, 140', 140", 140''' in terms of its performance at the rates demanded by a carrier class network, e.g., Gigabit Ethernet (GigE) interface throughput with typical concurrent sessions of the order of up to 100K or higher.

For example, in a Voice over Internet Protocol (VoIP) service, ports used to carry the media part of the call are dynamically assigned through signaling, taken down upon call termination, and reused for a subsequent call at a later time. Firewalls ideally need to filter traffic dynamically by opening/closing ports depending on the state or progress of a call. This technology is referred to as "dynamic pinhole filtering." The correct implementation of this technology, e.g., in border gateway 140, provides a good level of protection at a level of granularity not otherwise achievable with other current security technologies. The evaluation of the implementation and level of protection provided by the dynamic pinhole filtering at high traffic rates may be provided by the preferred methods and apparatus described herein.

Networks 104 also include a media gateway 144, e.g., a H.248 Line Gateway, coupled to local carrier IP network 110 via link 146. Media gateway 144 is also coupled to a plurality of twisted pair copper lines (148, 150, 152).

Application infrastructure 102 includes an Application Server Platform 158. Application Server Platform 158 includes a plurality of application servers (application server 1 127, application server N 127'). Exemplary application servers 127, 127' are, e.g., the CS2K application server from Nortel Networks. In some embodiments, local carrier integration applications may communicate with the Application Server Platform 158 via SIP signaling 178, thus providing an interface to a SS7 signaling network.

Customers, e.g., residential and/or business customers, obtain access to networks 104 via the access infrastructure 106. Access infrastructure 106 includes copper lines, e.g., twisted pair copper lines and coupling devices, indicated by dotted line grouping 184 and/or by higher capacity lines, e.g., Digital Subscriber Lines (DSL) and/or Fiber To The Premise (FTTP) optical cables, coupling devices, and or other transmission devices such as repeaters, indicated by dotted line grouping 186.

Customer Premise Facilities 108, includes a plurality of different types of equipment such as, e.g., Integrated Services Digital Network (ISDN) customer equipment 188, Digital Loop Carrier (DLC) customer equipment 189, Plain Old Telephone Service (POTS) customer equipment 190, PBX network User I/O devices 192, Integrated Access Devices (IAD) 193, e.g., devices which supports voice, data, and video streams over a single high capacity circuit, and a SIP phone 194. The ISDN customer equipment 188, e.g., a video conferencing system including an ISDN interface is coupled to media gateway 144 via line 148. DLC customer equipment 189 is coupled to media gateway 144 via line 150. POTS customer equipment 190, e.g., a pulse type phone, a dual tone multi-frequency (DTMF) type phone, a fax machine, is coupled to media gateway 144 via POTS line 152. DSL or fiber link 197, e.g., a trunk, couples the local carrier IP network 110 to a customer Private Branch Exchange (PBX) 198, e.g., a Meridian (H.323/MDCN) PBX which is located at the customer premise facility 108. User PBX I/O devices 192 are coupled to PBX 198 via local network link 199. DSL or fiber link 101, e.g., a trunk, couples the local carrier IP network 110 to a Integrated Access Device Gateway 101, e.g., a Master Gateway Control Protocol (MGCP) IAD gateway, which is located at the customer premise facility 108. User IAD I/O device 103 is coupled to IAD gateway 101 via local network link 105. SIP phone 194 is coupled to local carrier IP network 110 via DSL or fiber link 107.

Figures 2, 2A:
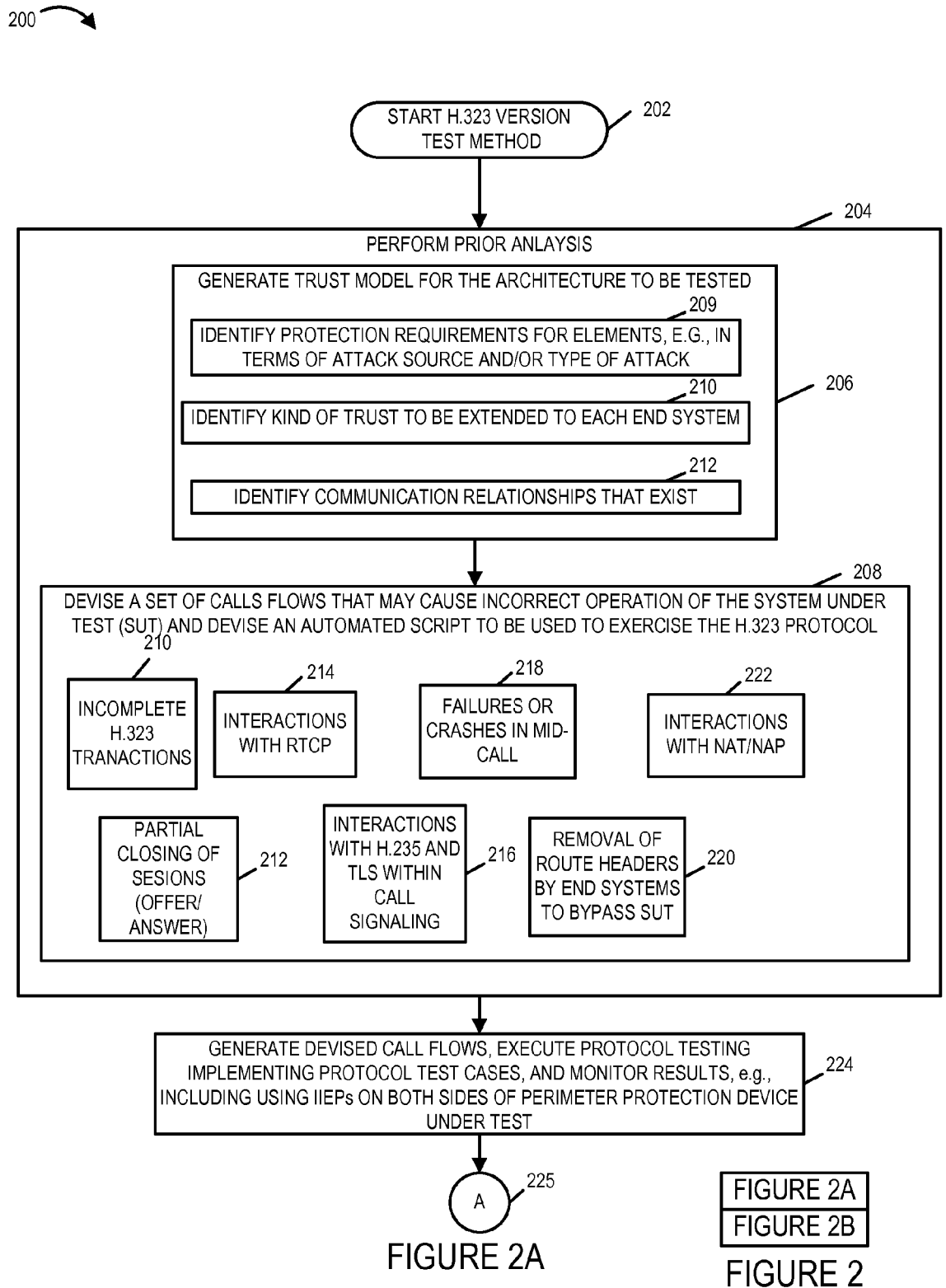
FIG. 2 comprising the combination of FIG. 2A

FIG. 2 comprising the combination of FIG. 2A and FIG. 2B is a flowchart 200 of an exemplary method of testing and evaluating the vulnerability and performance of network perimeter protection devices. These network perimeter protection devices protect crucial network assets such as softswitch infrastructure components, e.g., media gateways, signaling gateways, and application servers, by blocking potentially nefarious unwanted traffic from ever reaching those crucial assets. These network perimeter protection devices, e.g., border gateway 140, implement firewall capabilities in both a stateless and stateful modes, the stateful modes being extremely consumptive of CPU cycles. The border gateway 140 uses the "dynamic pinhole filtering" as described above. The exemplary method of flowchart 200 is directed toward testing and evaluating a network perimeter protection device or devices interfacing with an external service provider network utilizing H.323 or a similar protocol.

The method starts in step 202 where system information, e.g., topology, element, signaling messages employed is gathered. Operation proceeds from step 202 to step 204. In step 204, a prior analysis of the system is performed. Step 204 includes sub-step 206 of generating a trust model for the architecture to be tested and sub-step 208 of devising a set of call flows that may cause incorrect operation of the system under test (SUT) and devising an automated script to be used to exercise the H.323 protocol.

Sub-step 206 further includes lower level sub-steps 209, 210 and 212. In sub-step 208, protection requirements for elements, e.g., in terms of attack source and/or type of attack are identified. In sub-step 210, the kind and/or level of trust to be extended to each end system is identified. In sub-step 212, the communication relationships that exists are identified.

In sub-step 208, as previously stated, a set of call flows that may cause incorrect operation of the SUT are devised. Exemplary call flows include: incomplete H.323 transactions 211, partial closing of sessions, e.g., offer/answer 213, interactions with RTCP 214, interactions with H.235 and TLS within call signaling 216, failures or crashes in mid-call 218, removal of route headers by end systems to bypass SUT 220, and interactions with NAT/NAP 222. Other call flows could be devised, as is well known.

Operation proceeds from step 204 to step 224, where the devised call flows of step 208 are generated and protocol testing test cases are executed, generating signals which are input to the SUT and the results are monitored. Step 224 involves the coupling to the SUT of specialized pinhole testing apparatus, implemented in accordance with the preferred embodiments described herein, and the use of such apparatus. The specialized pinhole testing apparatus includes Integrated Intelligent End-Points (IIEPs) placed outside the firewall in the untrusted network and inside the firewall in the trusted network being guarded by the network perimeter protection device, e.g., border gateway.

Operation proceeds from step 224 via connecting node A 225 to step 226. In step 226, checks are performed to identify any observed or determined problems. Various operations that may be performed in the checking process of step 226 include: (i) identifying an excessive delay in opening "pinholes" resulting in an unintentional denial or service 228, e.g., the interruption or prevention of one from making calls (ii) determining any incorrectly allocated "pinholes" resulting in denial of service 230, (iii) determining any openings of extraneous "pinholes"/IP address combinations through the firewall, increasing the systems vulnerability through unrecognized backdoors 232, (iv) determining any incorrect operation that includes permanently-open pinholes as well as pinholes that fail to be opened, thus causing a call failure 234, (v) determining any inability to correlate call-state information with dynamically established rules in the firewall 236, and (vi) determining failures to perform a protocol test case in accordance with the H.323 standard.

Operation proceeds from step 236 to step 238. In step 238, the test system is operated to measure the delay to pinhole opening and the delay to pinhole closing under various combinations of different call loads and different protocol test cases using a performance analyzer, e.g., an Integrated Testing Analyzer (ITA) tool, for SUTs with stateful firewall capabilities under carrier class rates of operation. Step 238 includes sub-steps 240, 241, 242, 244, and 246. In sub-step 240, IIEPs are supplemented with a traffic generator and the firewall is stressed with increasing loads, e.g., up to 100,000 concurrent stateful sessions, while collecting study information on the behavior of the firewall. In sub-step 241, different protocol test cases are executed, e.g., the set of test cases exercising the full or nearly full spectrum range of uses cases specified by the H.323 protocol for a particular port pair. Operation proceeds from step 240 and step 241 to step 242. In step 242, the analyzer module records the Closing Delay Window of Vulnerability (CDWV) timings, records detections of incorrect protocol handling, processes the information, presents curves of CDVW vs. load in a graphical form for analysis, presents CDWV vs. incorrect protocol handling information, and presents correlation relationship information. Then in step 244, stress points are determined from the curves and the specifics of the overload behavior are documented corresponding to the stress points. In step 246, benchmarks on CPU utilization, cpu(t), are determined on firewall CPU performance from the load parameters and H.323 protocol conformance; and conclusions drawn on the appropriate corresponding stateful firewall design model.

Figures 3, 3A:
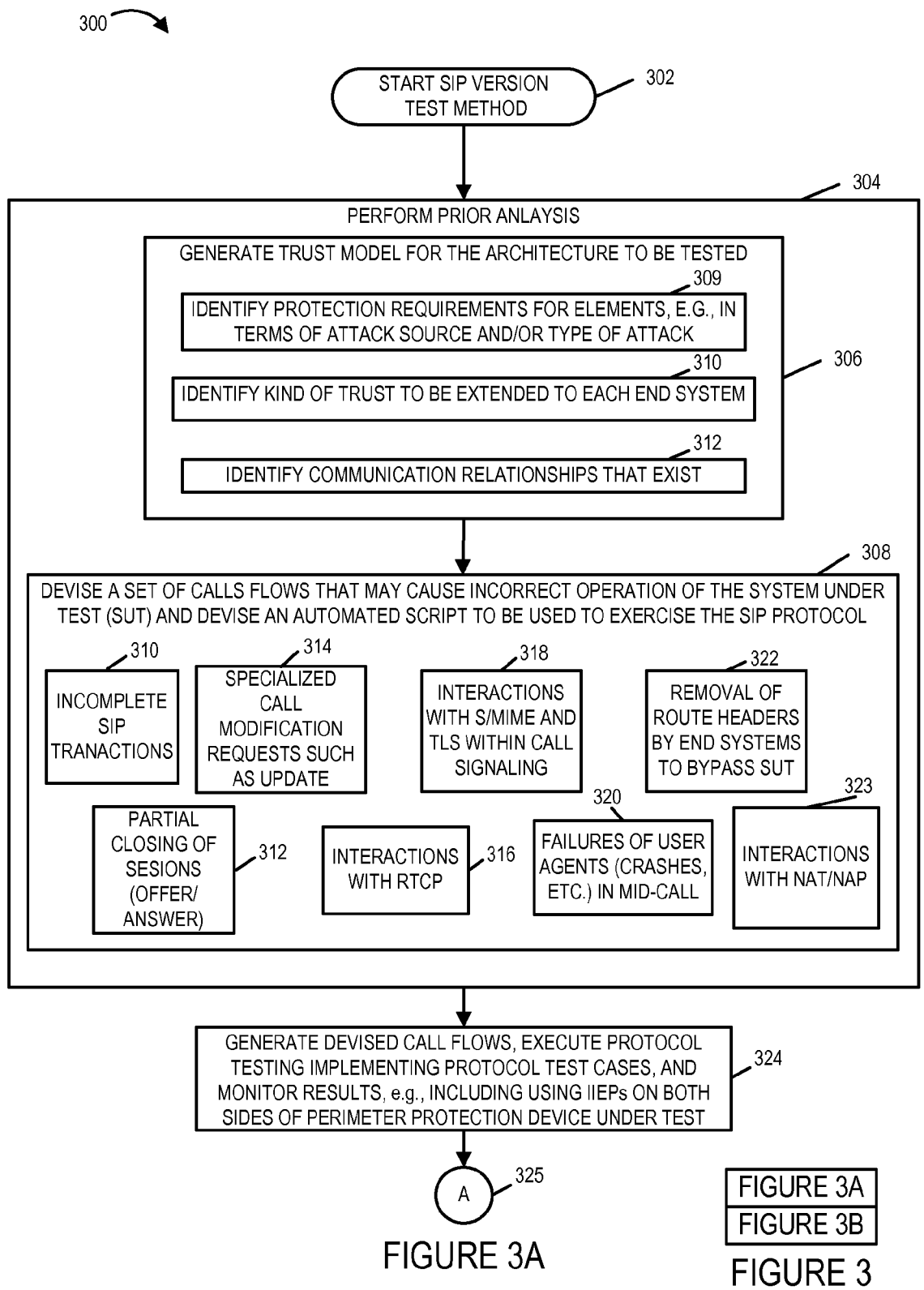
FIG. 3 comprising the combination of FIG. 3A
Figure 3B:
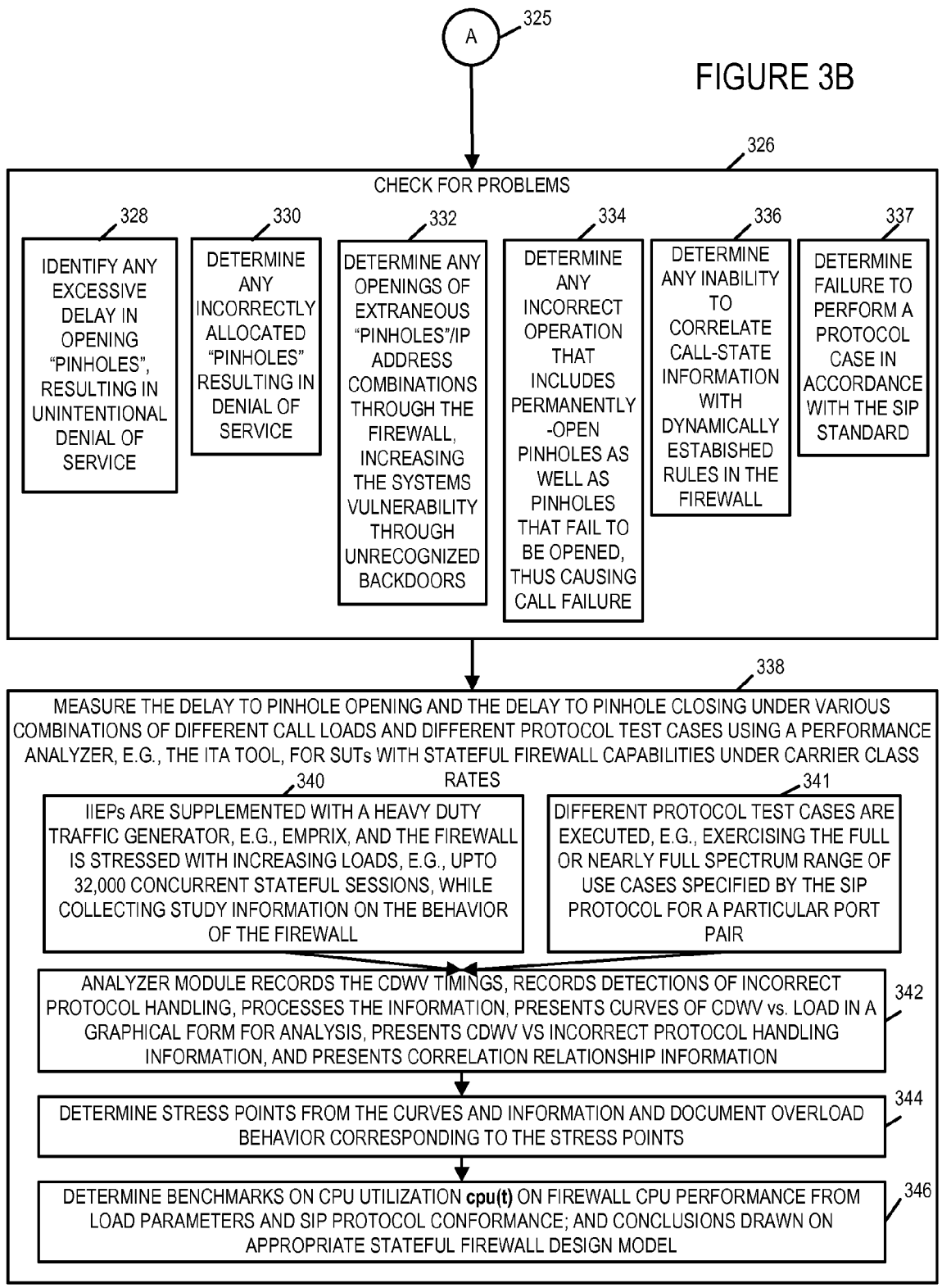
FIG. 3B is a flowchart of an exemplary method of testing and evaluating the vulnerability and performance of network perimeter protection devices; the method is directed toward H.323 or a similar protocol.

FIG. 3 comprising the combination of FIG. 3A and FIG. 3B is a flowchart 300 of an exemplary method of testing and evaluating the vulnerability and performance of network perimeter protection devices. The exemplary method of flowchart 300 is directed toward testing an evaluating a network perimeter protection device or devices interfacing with a service provider network utilizing SIP or a similar protocol.

The method starts in step 302 where system information, e.g., topology, element, signaling messages employed is gathered. Operation proceeds from step 302 to step 304. In step 304, a prior analysis of the system is performed. Step 304 includes sub-step 306 of generating a trust model for the architecture to be tested and sub-step 308 of devising a set of call flows that may cause incorrect operation of the system under test (SUT) and devising an automated script to be used to exercise the SIP protocol.

Sub-step 306 further includes lower level sub-steps 309, 310 and 312. In sub-step 309, protection requirements for elements, e.g., in terms of attack source and/or type of attack are identified. In sub-step 310, the kind and/or level of trust to be extended to each end system is identified. In sub-step 312, the communication relationships that exist are identified.

In sub-step 308, as previously stated, a set of call flows that may cause incorrect operation of the SUT are devised, and a automated script to be used to exercise the SIP protocol is devised. Exemplary call flows include: incomplete SIP transactions 311, partial closing of sessions, e.g., offer/answer 313, specialized call modification requests such as update 314, interactions with RTCP 316, interactions with S/MIME and TLS within call signaling 318, failures of user agents, e.g., crashes, in mid-call 320, removal of route headers by end systems to bypass SUT 322, and interactions with NAT/NAP 323. Other call flows could also be devised, as is well known.

Operation proceeds from step 304 to step 324, where the devised call flows of step 308 are generated and protocol testing test cases are executed, generating signals which are input to the SUT and the results are monitored. Step 324 involves the coupling to the SUT of the specialized pinhole testing apparatus, and the use of such apparatus. The exemplary specialized pinhole testing apparatus includes Integrated Intelligent End-Points (IIEPs) placed outside the firewall in the untrusted network and inside the firewall in the trusted network being guarded by the network perimeter protection device, e.g., border gateway.

Operation proceeds from step 324 via connecting node A 325 to step 326. In step 326, checks are performed to identify any observed or determined problems. Various operations that may be performed in the checking process of step 326 include: (i) identifying an excessive delay in opening "pinholes" resulting in an unintentional denial or service 328, e.g., the interruption or prevention of one from making calls (ii) determining any incorrectly allocated "pinholes" resulting in denial of service 330, (iii) determining any openings of extraneous "pinholes"/IP address combinations through the firewall, increasing the systems vulnerability through unrecognized backdoors 332, (iv) determining any incorrect operation that includes permanently-open pinholes as well as pinholes that fail to be opened, thus causing a call failure 334 (v) determining any inability to correlate call-state information with dynamically established rules in the firewall 336, and (vi) determining failure to perform a protocol case in accordance with the SIP standard.

Operation proceeds from step 326 to step 338. In step 338, the test system is operated to measure the delay to pinhole opening and the delay to pinhole closing under different combinations of different call loads and different protocol test cases using a performance analyzer, e.g., the Integrated Testing Analyzer (ITA) tool, for SUTs with stateful firewall capabilities under carrier class rates of operation. Step 338 includes sub-steps 340, 341, 342, 344, and 346. In sub-step 340, IIEPs are supplemented with a traffic generator, and the firewall is stressed with increasing loads, e.g., up to 100,000 concurrent stateful sessions, while collecting study information on the behavior of the firewall. In sub-step 341, different protocol test cases are executed, e.g., exercising the full or nearly full spectrum range of use cases specified by the SIP protocol for a particular port pair. Operation proceeds from steps 340 and 341 to step 342. In step 342, the analyzer module records the CDWV timings, records detections of incorrect protocol handling, processes the information, and presents curves of CDVW vs. load in a graphical form for analysis, presents CDWV vs. incorrect protocol handling information, and presents correlation relationship information. Then in step 344, stress points are determined from the curves and the specifics of the overload behavior are documented corresponding to the stress points. In step 346, benchmarks on CPU utilization, cpu(t), are determined on firewall CPU performance from the load parameters and SIP protocol conformance; and conclusions drawn on the appropriate corresponding stateful firewall design model.

Figure 4:
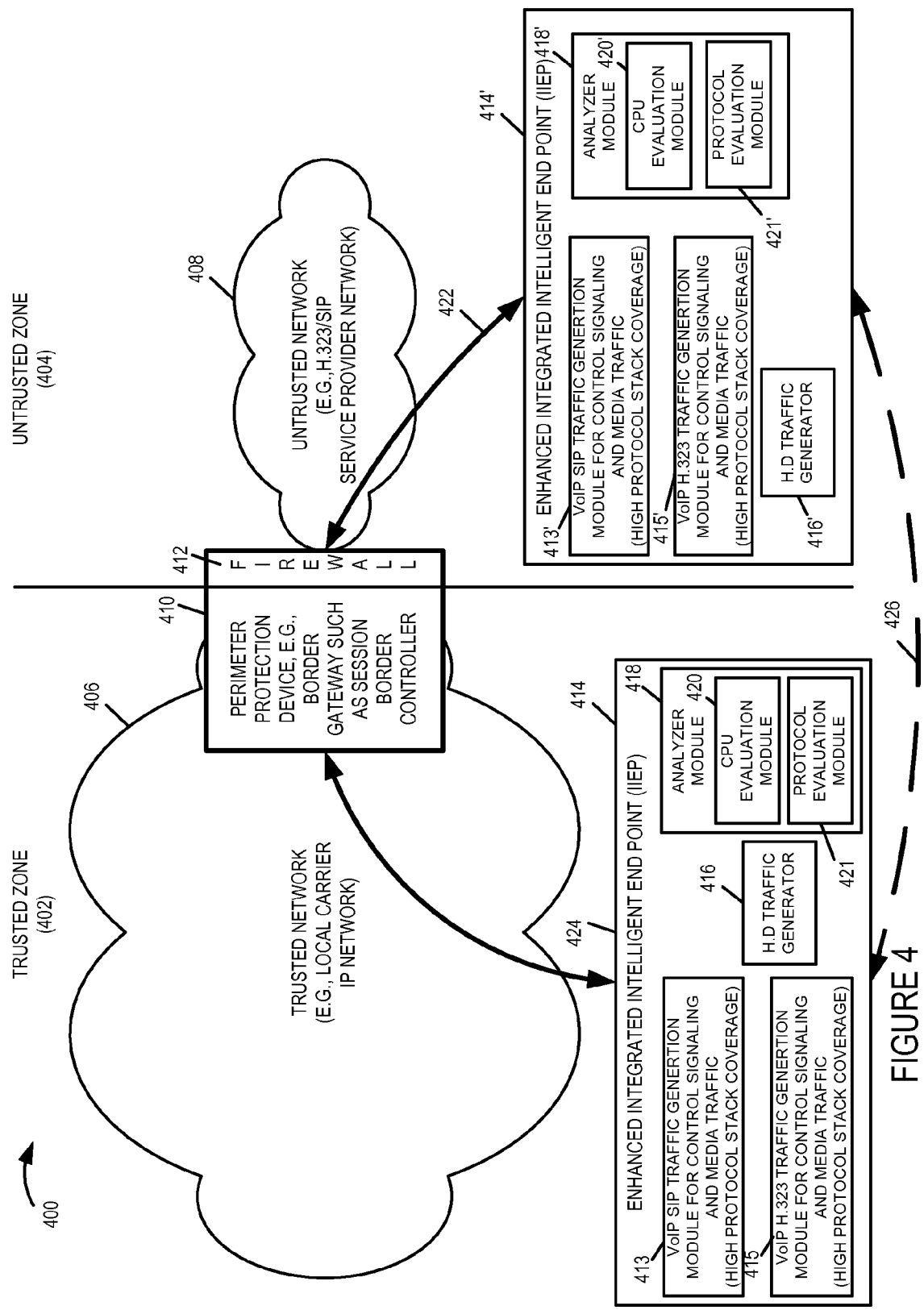
FIG. 4 is a drawing of an exemplary system under test including test apparatus implemented in accordance with the present invention.

FIG. 4 is a drawing 400 of an exemplary system under test. The exemplary system includes a trusted zone 402 and an untrusted zone 404. The trusted zone 402 includes a trusted network 406, e.g., a local carrier IP network. The untrusted zone 404 includes an untrusted network, e.g., a H.323 and/or SIP service provider network 408. The trusted network 406 is guarded on its network edges by perimeter protection devices 410, e.g., a border gateway such as a session border controller device. The perimeter protection device 410 includes a firewall 412 serving to guard the trusted network 410 and its softswitch infrastructure components. Perimeter protection device 410 includes stateless and stateful modes of operation, including a firewall that implements dynamic pinhole filtering. Perimeter protection device 410 uses a set of rules to control the opening and closing of these pinholes; those rules may, and often do, include the maintenance and use of state information. Perimeter protection device 410 may have been specified by its manufacturer to operate within a set of performance values under a set of specified loading conditions, e.g., a number of concurrent stateful sessions.

Test apparatus are included on each side of the firewall 412 to stress and evaluate the firewall 412 and the performance of the perimeter protection device 410. An exemplary test apparatus includes an integrated intelligent end point (IIEP) 414 including a traffic generator 416, a SIP traffic generation module 413 for control signaling and media traffic, a H.323 traffic generation module 415 for control signaling and media traffic, and an analyzer module 418. SIP traffic generation module 413, e.g., the SIP Forum Basic User Agent Test Suite, generates signals that exercise the full or nearly full use case SIP protocol stack. H.323 traffic generation module 415, e.g., the ProLab H.323 Test Agent, generates signals that exercise the full or nearly full H.323 use case protocol stack. The analyzer module 418, includes a CPU evaluation module 420 and a protocol evaluation module 421. Traffic generator module 416 allows the IIEP to generate traffic with increasing loads, e.g., to produce up to 100,000 concurrent stateful sessions, to stress firewall 412. Analyzer module 418 allows the IIEP to monitor, record and evaluate the operation of the perimeter protection device, e.g., detecting faults, detecting denials of service, detecting vulnerabilities, violations of firewall rules, and CPU utilization. CPU evaluation module 420 evaluates perimeter protection device 410 as loading conditions increase resulting in increased CPU utilization cpu (t). The CPU evaluation module 420 compares observed CPU firewall performance to benchmarks to evaluate the stateful firewall design model. Protocol evaluation module 421 evaluates protocol implementation completeness and the effects of attempting to execute an element of the full protocol stack which the firewall device vendor has not implemented in compliance with the standard, e.g., in terms of the effect on closing window of vulnerability delays.

IIEP 414' in untrusted zone 404 is the same or similar to IIEP 414 in trusted zone 402. Although each IIEP 414, 414' may be implemented with similar facilities, different modules or functions within the IIEP may be used depending upon where the IIEP is situated, e.g., with respect to firewall 412. For example, traffic generator 416' in IIEP 414' may be the primary source of the high traffic flows, while analyzer module 418 in IIEP 414 may be the primary recipient of monitored information used for CPU evaluation under load. Solid arrow 422 represents signaling flows between IIEP 414' through untrusted network 408 to the exterior side firewall 412; while solid arrow 424 represents signaling flows between IIEP 414 through trusted network 402 to the interior side of firewall 412. Dashed arrow 426 shows an optional connection between IIEP 414 and IIEP 414' provided for testing purposes to coordinate operations and share information between the IIEPs 414, 414'.

Figure 5:
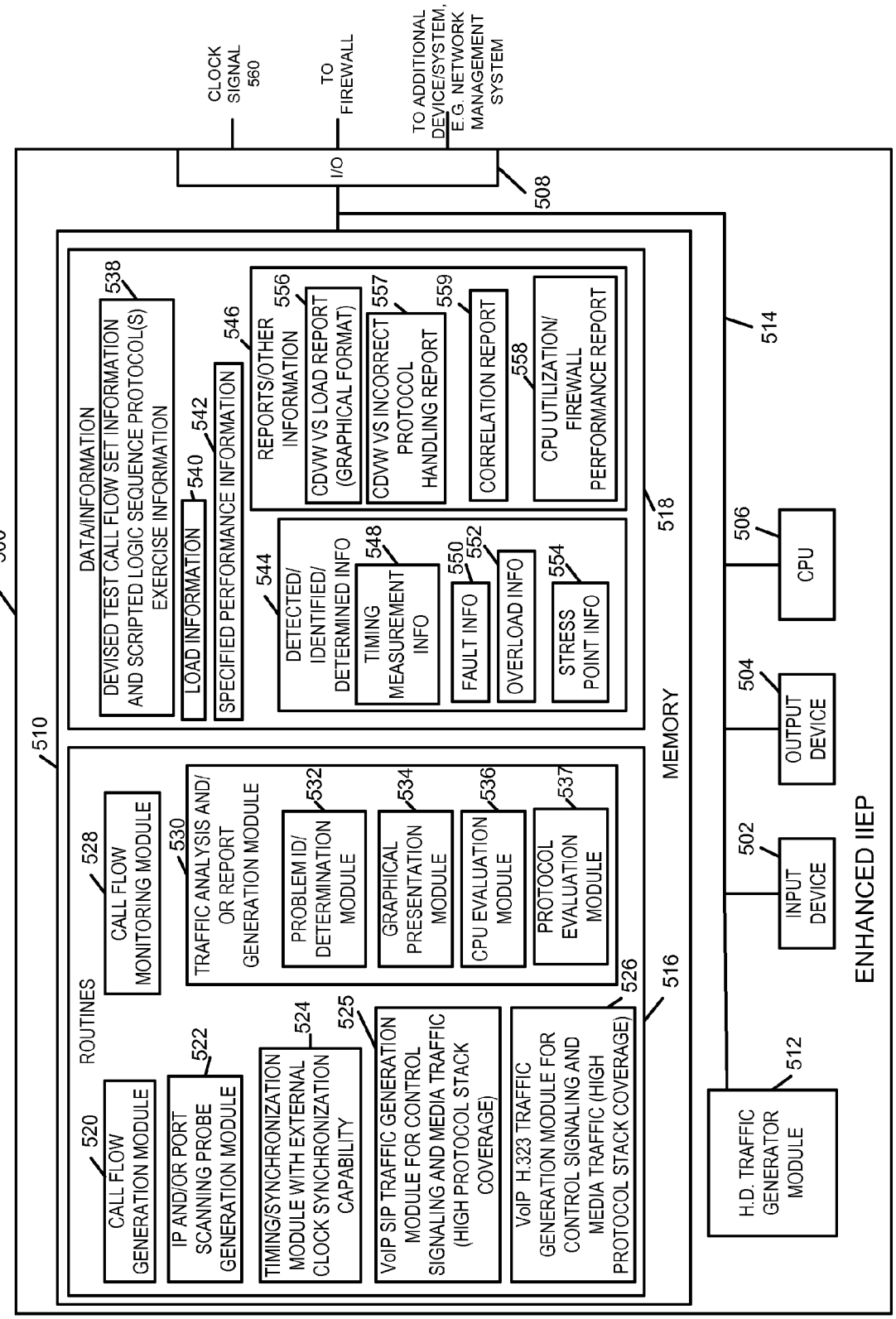
FIG. 5 illustrates an exemplary testing apparatus, an Intelligent Integrated End Point (IIEP), implemented in accordance with the present invention and using methods according to the present invention.

FIG. 5 illustrates an exemplary IIEP 500 which may be used as the IIEP 414 or 414' shown in FIG. 4. The IIEP 500 includes an input/output (I/O) device 508 which operates as an interface to the firewall 412 and to additional devices and/or systems, e.g., a network management system and/or external clock signal 560. The IIEP 500 also includes an input device 502, output device 504, processor, e.g., CPU, 506, a memory 510, a traffic generator module 512 which are coupled together and to the I/O device 508 via a bus 514.

Input device 502 may be implemented as a keyboard through which a system administrator can enter commands and/or other data, a network interface or media interface (e.g., a disk drive). Output device 504 may be implemented as, e.g., a display and/or printer, and can be used to display and/or print generated reports and information relating ongoing tests, monitoring and/or firewall test results. CPU 506 controls operation of the IIEP 500 including the generation of test signals and reports under control of one or more of the modules stored in memory 510 which are executed by CPU 506.

Memory 510 includes routines 516 and data/information 518. Various modules included in routines 516 include a call flow generation module 520, an IP address and/or port scanning probe generation module 522, timing/synchronization module 524, a SIP traffic generation module 525 for control signaling and media traffic (high protocol stack coverage), an H.323 traffic generation module 526 for control signaling and media traffic (high protocol stack coverage), a call flow monitoring module 528, and a traffic analysis and/or report generation module 530. Call flow generation module 520 is used to generate call flows which have been devised, based on the model of the system architecture which are intended to potentially cause incorrect operation of the system under test, and pre-loaded into the memory 510. Call flow generation module 520 uses information 538 to generate call flows and to exercise the full or nearly full set of the protocol stack, e.g., SIP and/or H.323 full protocol stacks. IP and/or port scanning probe generation module 522 is used to generate test signals in accordance with the call flows. Timing/synchronization module 524 is used to synchronize the operation of the IIEP 500 with another IIEP device, e.g., by synchronizing the IIEP operation to an external clock signal source 560, which is also used by at least one other IIEP device. SIP traffic generation module 525 is used to generate SIP compliant signals to exercise the full or nearly full SIP use case protocol stack in accordance with the preferred testing process. H.323 traffic generation module 526 is used to generate H.323 compliant signals to exercise the full or nearly full H.323 use case protocol stack in accordance with preferred the testing process. Call flow monitoring module 528 is used to collect information, e.g., pertaining to the firewall, as the testing proceeds. Traffic analysis and/or report generation module 530 is used to analyze detected signals including signals passing through the firewall, signals rejected by the firewall, signals indicating faults, and signals indicating overload, and generate reports on firewall operation there from.

Traffic analysis and/or report generation module 530 includes a problem identification (ID)/determination module 532, a graphical presentation module 534, a CPU evaluation module 536, and a protocol evaluation module 537. Problem ID/determination module 532 (i) identifies excessive delays in pinhole opening resulting in unintentional denial of service, (ii) determines any incorrectly allocated pinholes resulting in denial of service, (iii) determines any openings of extraneous pinholes/IP address combinations through the firewall, increasing the system's vulnerability to unrecognized back doors, (iv) determines any incorrect operations that include permanently open pinholes as well as pinholes that fail to be opened, causing call failure, and/or (v) determine the inability to correlate call state information with dynamically established rules in the firewall. Graphical presentation module 534 processes information and presents curves to the user in graphical format, e.g., curves of CDVW vs load. CPU evaluation module 536 determines stress points from the collected information and documents the overload behavior corresponding to the stress points. The CPU evaluation module 536 also evaluates firewall CPU performance as a function of the loading conditions, compares the performance measured to benchmark levels and specifications of the firewall design, and generates reports identifying conclusions.

Traffic generator module 512 is operated under the direction of the CPU 506 and functions in coordination with routines 510. Traffic generator module 512 is used to stress the firewall at different load level, e.g., up to 100,000 concurrent stateful sessions, so that the firewall's behavior and performance may be studied and evaluated as a function of load. High load levels are a particularly significant factor when evaluating CPU performance of a perimeter protection device. Protocol evaluation module 537 evaluates protocol implementation completeness, e.g., identifying which members of a protocol stack the firewall device vendor has not implemented in compliance with the standard. Protocol evaluation module 537 also evaluates the effects of attempting to execute an element of the full protocol stack which the firewall device vendor has not implemented in compliance with the standard in terms of the effect on firewall security, e.g., closing window of vulnerability delay impact.

Data/information 518 includes devised test call flow set information 538, load information 540, specified performance information 542, detected/identified/determined information 544, and reports/other information 546. Devised test call flow information set information and scripted logic sequence protocol(s) exercise information 538 may include, e.g., incomplete H.323 transactions, incomplete SIP transactions, partial closing of sessions, specialized call modification request such as updates, interactions with H.235 and TLS within call signaling interactions with RTCP, interactions with S/MINE and TLS with call signaling, failures of user agents such as crashes in mid-call, removal of route headers by end systems to bypass SUT, and/or interactions with NAT/NAP, and information identifying a sequence of cases of protocol stack instructions to be executed by modules 525 and/or 526. Devised test call flow set information and scripted logic sequence protocol(s) exercise information 538 may be pre-loaded, prior to the initiation of testing, by a system administrator or operator, via input interface 502. Load information 540 includes information, e.g., a loading test profile, on the different loading conditions of the firewall to be implemented at different times as part of the test sequence. Load information 540 is used as input by the traffic generator module 512. Specified performance information 542 includes firewall design characteristics and/or requirements that are being evaluated and against which measured performance is compared. Specified performance information 542 may include, e.g., overload condition specifications, pinhole opening and closing delay characteristics, and specified CPU performance as a function of load. Detected/identified/determined information 544 includes information obtained from the call flow monitoring module 528 and information obtained from the traffic analysis and/or report generation module 530. Detected/identified/determined information 544 includes timing measurement information 548, fault information 550, overload information 552 and stress point information 554. Timing measurement information 548 may include measured pinhole opening and closing information. Fault information 550 may include information such as identified protocol stack instructions which have not been implemented in compliance with the standard, identified denials of service, determined extraneous pinhole openings, determined permanently open pinholes, determines pinholes that fail to open, and/or determined faults in correlation of call state information with firewall rules. Overload information 552 includes information documenting the firewall behavior upon reaching an overload condition as well as the input conditions, e.g., loading and/or type of signaling, that resulted in the overload. Stress point information 554 includes information documenting the firewall behavior at a stressed condition as well as the input conditions, e.g., protocol instruction being exercised at the stress point, loading and/or type of signaling, that resulted in the stressed condition.

Reports/other information 546 includes CDVW vs load reports 556, e.g., presented in a graphical format, a CDVW vs incorrect protocol handling report 557, a correlation report 559, and CPU utilization/firewall performance report 558. The CPU utilization/firewall performance report 558 includes information identifying detected problem areas, marginal areas, and information comparing detected, measured, and/or determined information to the specified performance information for the firewall device, which includes benchmarking the firewall device as a function of the degree to which the full protocol set has been implemented, protocol handling, and load.

Figure 6:
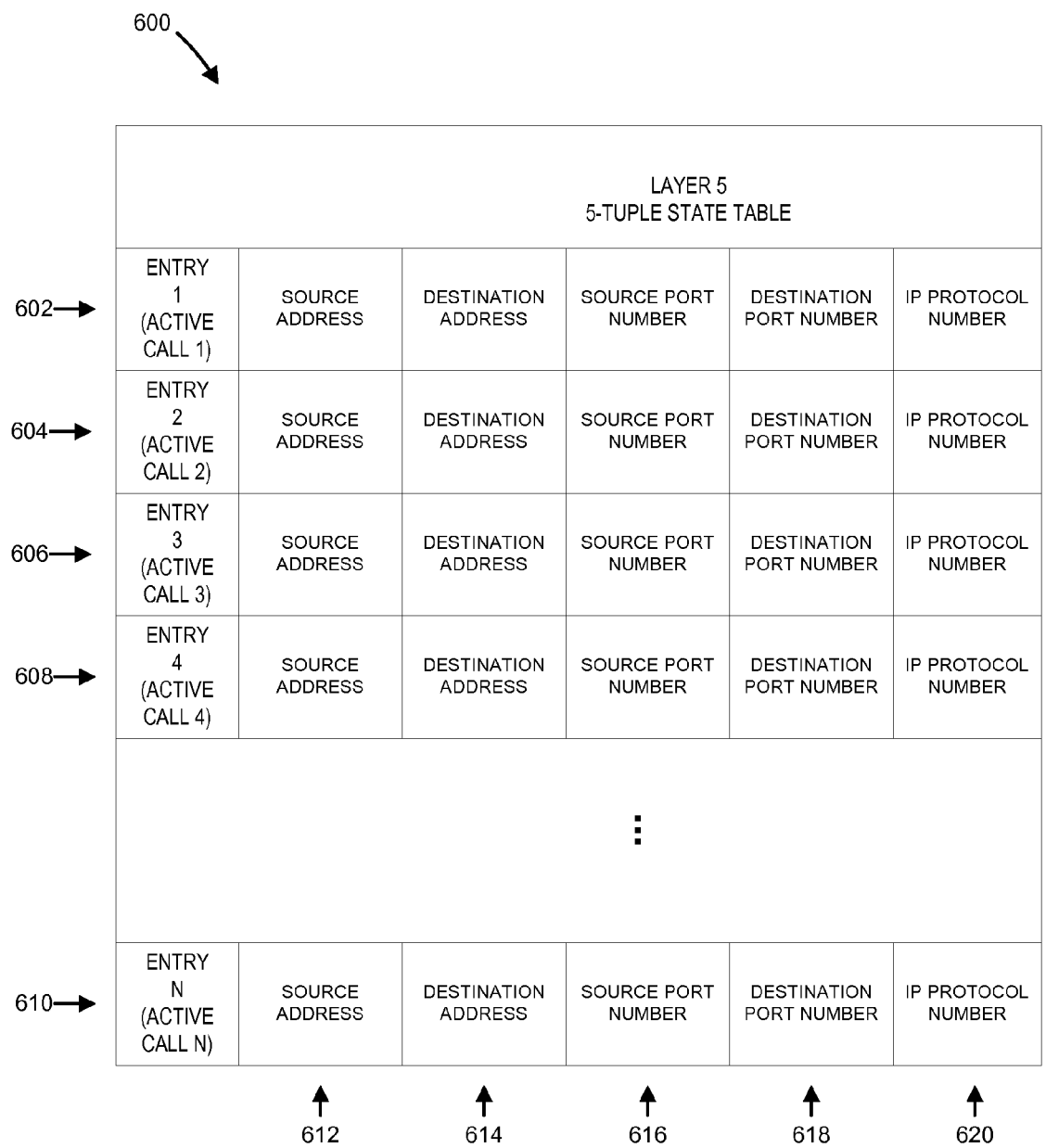
FIG. 6 is a drawing of an exemplary n-tuple state table, which may included as part of a network edge security device including a firewall to store session information.

FIG. 6 is a drawing of an exemplary n-tuple state table 600, which may included as part of a network edge security device including a firewall to store session information. The preferred methods and systems evaluate the efficiency of a network edge security device's algorithm to retrieve and use stored information in its state table under various conditions, e.g., each of the full or near full set of protocol cases, various traffic load levels, various combinations of different protocol case and various traffic load levels. Exemplary state table 600 is an exemplary layer 5 IP 5-tuple state table that may be included as part of an exemplary perimeter protection device, e.g., device 410 of FIG. 4. Each row of table 600 corresponds to a set of state information for an active call. First row 602 corresponds to the state entries for active call 1; second row 604 corresponds to the state entries for active call 2; third row 606 corresponds to the state entries for active call 3; fourth row 608 corresponds to the state entries for active call 4; Nth row 610 corresponds to the state entries for active call N. First column 612 corresponds to a source address; second column 614 corresponds to a destination address; third column 616 corresponds to the source port number; fourth column 618 corresponds to the destination port number; fifth column 620 corresponds to an IP Protocol number.

Exemplary state table size and memory used to store the table grows linearly as a function of the number of active calls. For each 5-tuple entry in table 600, several actions that are very CPU intensive need to be performed: (i) signaling packet inspection throughout the length of a cell, e.g., waiting for a BYE in SIP signaling; (ii) port coordination; (iii) keeping timers for two ports in each 5-tuple and looking for respective expirations. In addition to the signal packet processing, the timers require the association of RTP packets with table entries, requiring table traversal for every arriving media packet.

In order to obtain quantitative test results from which a firewall efficiency factor can be determined, and the efficiency of different firewall implementations tested and compared, various testing implementations involve testing firewalls of border gateway routers under varying session load conditions and for different rates of session change as may be expressed in the parallel termination of multiple communications sessions which are ongoing through a firewall being tested. As part of the test procedure, the firewall of a boarder gateway router is subjected to different amounts of constant or relatively constant numbers of ongoing communications sessions. During a period of time in which the number of ongoing communications sessions, e.g., VoIP calls, which are maintained is held constant, a large number of communications sessions, e.g., calls, are initiated. These calls which are in addition to the ongoing calls which are maintained, are terminated in parallel to stress the firewall. Thus, while the calls may be initiated in parallel or at different times, the calls are normally terminated in parallel to implement a known measurable rate of communications session change, e.g., the dropping of 10,000 calls or more in a second. Different numbers of calls are terminated in parallel during the period of time where a predetermined number of calls are maintained. As each of the different numbers of calls, corresponding to different rates of communications session change are terminated, CPU utilization in the device, e.g., border gateway router implementing the dynamic firewall is monitored. The CPU utilization information, reflecting different amounts of CPU utilization at different rates of communications session change, provides information on the efficiency of the firewall under a particular constant load, e.g., the fixed number of continuing communications sessions which are maintained while the rate of communications session change is varied. During the test process, the amount of time required to close pinholes from the time a communications session termination message is sent is also monitored thereby providing information on the rate of pinhole closing under different load conditions.

Different constant communications session loads are used during different periods of time as part of the processes of testing a wide range of different communications session change rates for a plurality of different constant communications session loads. The resulting test information is analyzed, processed and efficiency estimates are generated for the various constant communications sessions loads and different rates of communications session change. The resulting efficiency factors as well as pinhole closing rate information, CDWV measurements and/or CPU utilization information is processed and displayed in a graphical representation on a display device. Plots of the analysis may, and in some embodiments are, also printed.

As one example, an efficiency factor, $\epsilon$, which can be expressed as efficiency function, for a border gateway device including stateful dynamic pinhole filtering through its firewall may be determined using the following equation:

$$\epsilon = cpu(t)/(\text{call-rate}(t) \times (\int \text{call-rate}(t) dt))$$

where:
call-rate(t)=# of calls in progress at time t
cpu(t)=cpu utilization at a time t As noted above, the number of arriving calls and the total number of total calls in progress may be controlled using known test inputs and the cpu utilization may then be measured.

The testing method described above with regard to a first dynamic firewall, operating in a first border gateway router positioned between a trusted and untrusted network zone may be repeated for various different border gateway routers, e.g., a second, third, fourth, etc. router, each of which may include different hardware and/or dynamic firewall implementation software. In this manner CPU utilization and firewall implementation efficiency can be tested and compared in a verifiable manner while, at the same time testing the dynamic firewall to make sure that it provides the level of protection expected in terms of port opening and/or closing delays as communications sessions are initiated and/or terminated. As noted above for the individual border gateway, CPU utilization, determined efficiency factors, and/or port opening and/or closing delays measured for several different firewall implementations and/or border controllers are displayed in a single graphical representation allowing for simple and intuitive comparisons between the efficiency and reliability of various dynamic firewalls.

Figure 7A:
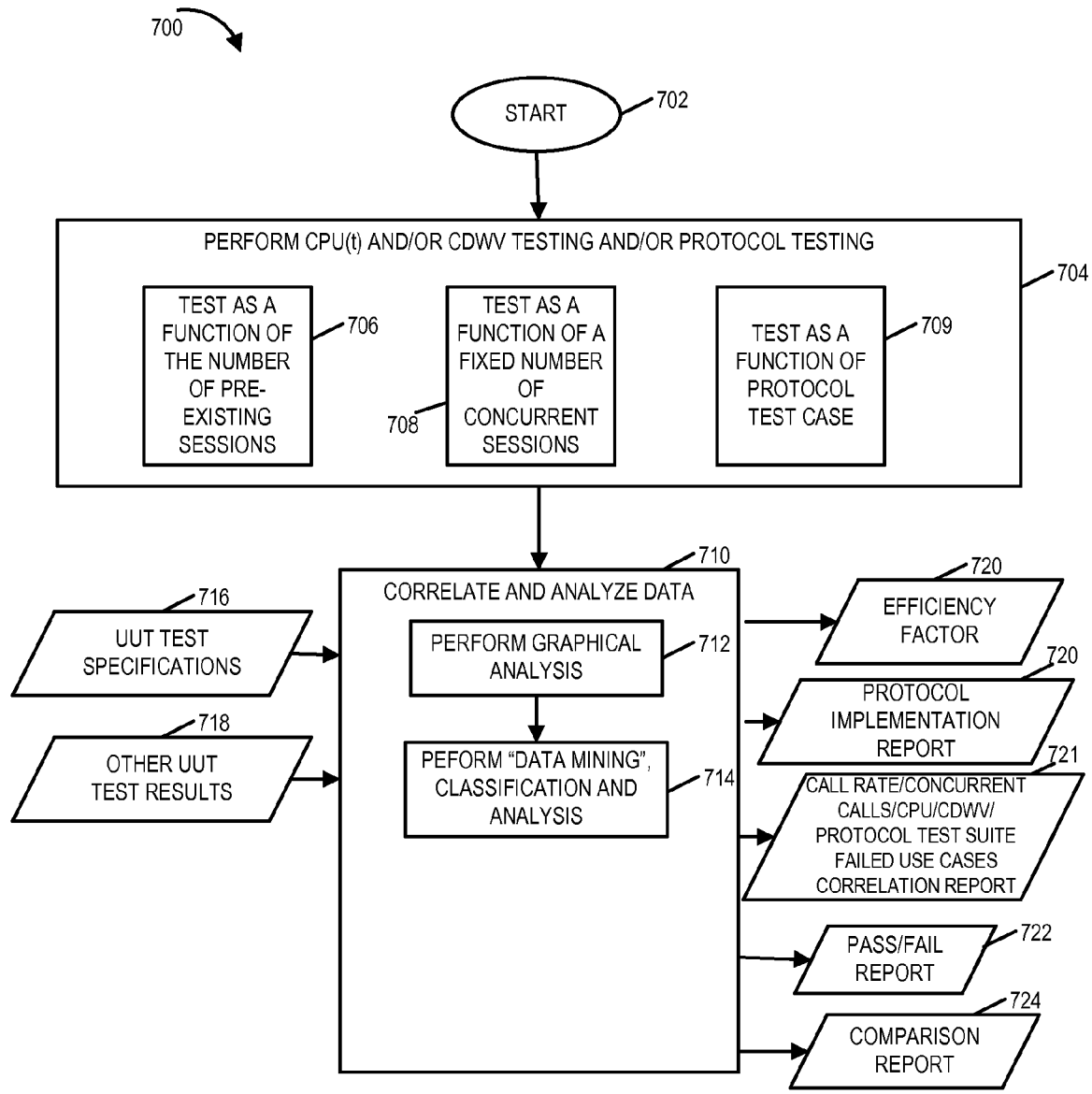
FIG. 7 comprising the combination of FIGS. 7A, 7B, and 7C is a flowchart of an exemplary method in accordance with the present invention of testing and evaluating dynamic pinhole capable firewall devices.
Figure 7B:
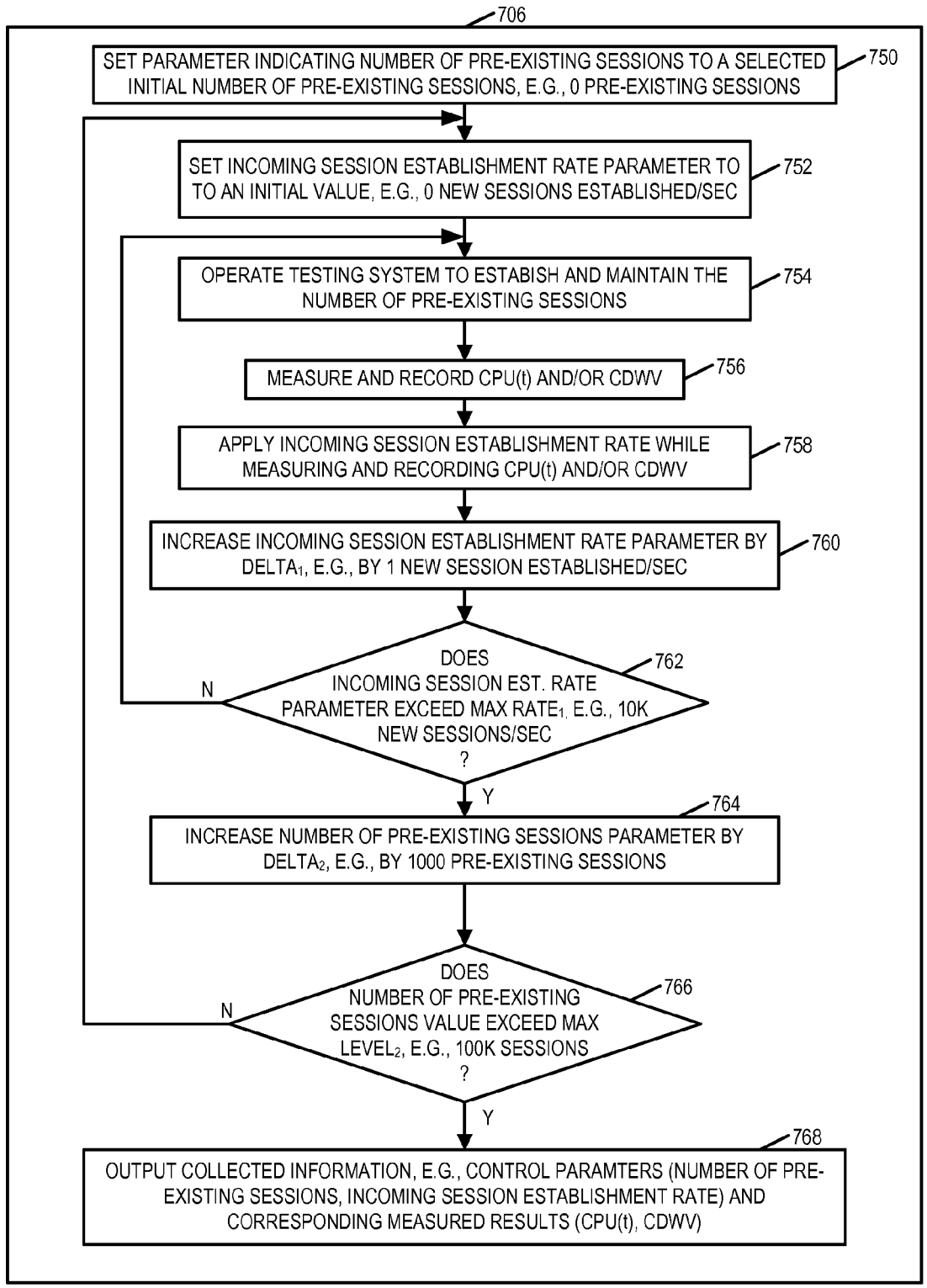
Figure 7C:
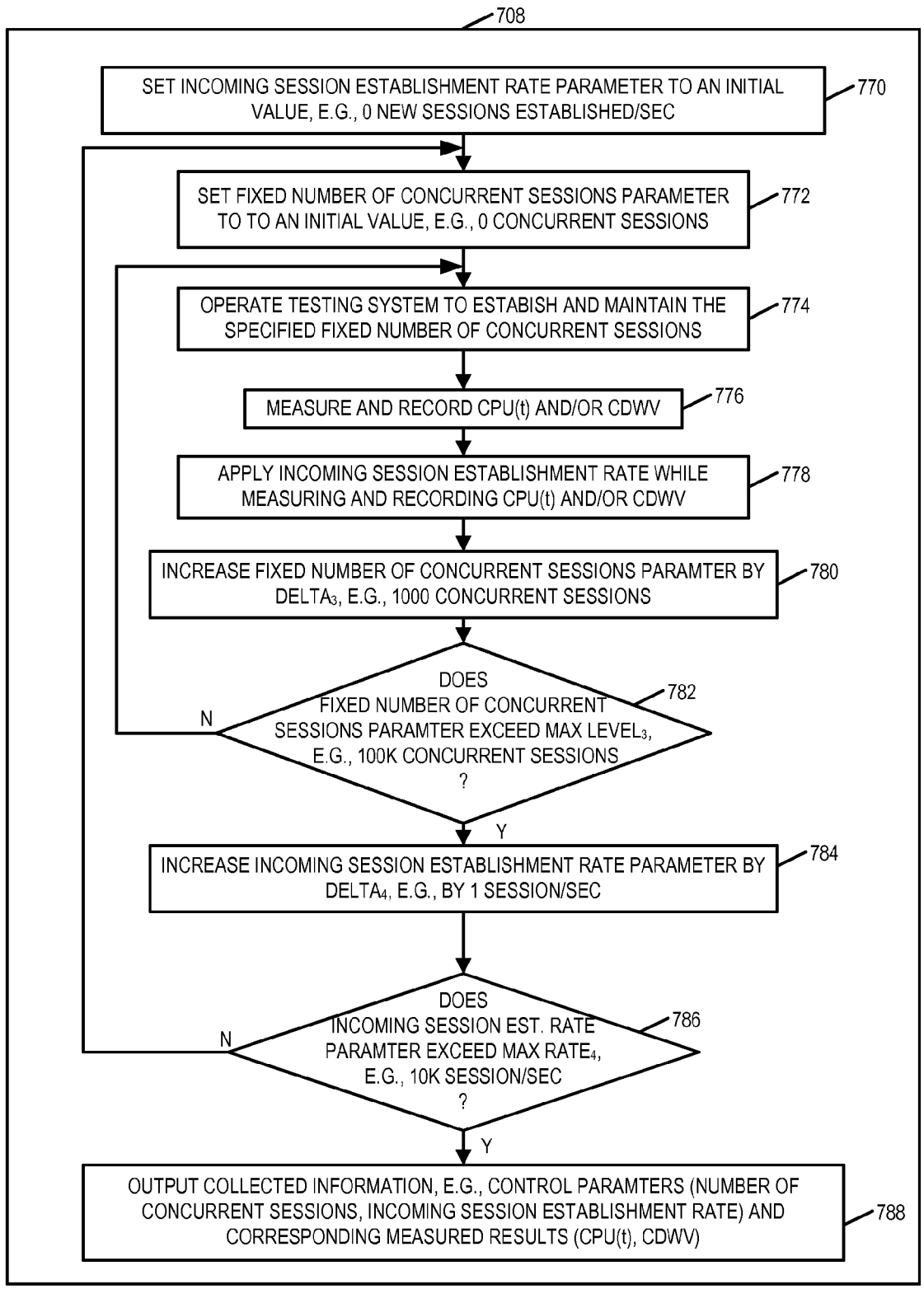

FIG. 7 comprising the combination of FIGS. 7A, 7B, and 7C is a flowchart 700 of an exemplary method of testing and evaluating dynamic pinhole capable firewall devices to evaluate performance and product suitability to carrier class environments. The method begins in start step 702, where the unit under test (UUT), a perimeter protection device, e.g., a border gateway such as a Session Border Controller with dynamic pinhole capability, is coupled to the testing apparatus, e.g., two Integrated Intelligent End Points (IIEPs) including a traffic generator module, a traffic generation module(s) for control signaling and media traffic having a high degree of protocol stack coverage capability, e.g., for SIP and/or H.323, and an analyzer module, with one IIEP on each side of the firewall. Operation proceeds from step 702 to step 704.

In step 704, the testing system is operated to perform CPU utilization (CPU(t)) and/or closing delay window of vulnerability (CDWV) testing and/or protocol testing. Step 704 includes sub-steps 706, 708 and 709. Steps 706 and 708 may be performed at different times, with step 709 being performed in parallel with one of step 706 or step 708 at any given time. Step 709 adds an additional input variable, the protocol test case, to the testing of steps 706 or 708. Step 709 executes, e.g., sequentially, a full or nearly full set of protocol test cases that is expected to be supported if the protocol stack had been implemented by the firewall device under test in a fully compliant manner which supports the full protocol specification feature set. One example of a protocol test case includes the use of encryption in messages. Another example of a different protocol test case includes the use of domain name servers (DNS). Other protocol test cases may include fault management features.

In sub-step 706, the testing system is operated to test as a function of the number of pre-existing sessions, obtaining CPU(t) measurements and/or CDWV measurements for different combinations of pre-existing sessions and new session establishment rates. In step 706, in some embodiments, for a given test point the pre-existing sessions are not being terminated, with the exception of a termination or terminations used to collect CDWV values. In sub-step 708, the testing system is operated to test as a function of a fixed number of concurrent sessions, obtaining CPU(t) measurements and/or CDWV measurements for different combinations of the number of concurrent sessions and the incoming sessions establishment rate. The number of concurrent sessions can be a combination of a number of pre-existing sessions which continue and a net gain/loss due to the number of incoming sessions being established minus the number of sessions being terminated. Testing of step 708 with different controlled breakdowns of the number of concurrent sessions is possible, in accordance with the present invention, with different proportions between the number of pre-existing sessions which continue and the number due to incoming sessions minus terminating sessions.

An exemplary implementation of sub-step 706 is included in FIG. 7B. The exemplary method of sub-step 706 starts in step 750, where the test system is operated to set a parameter indicating the number of pre-existing sessions to a selected initial number of pre-existing sessions, e.g., 0 pre-existing sessions. Operation proceeds from step 750 to step 752. In step 752, the test system is operated to set an incoming session establishment rate parameter to an initial value, e.g., 0 new sessions established per second. Operation proceeds from step 752 to step 754. In step 754, the test system is operated to establish and maintain the number of pre-exiting sessions as indicated by the pre-existing session indicator parameter. Operation proceeds from step 754 to step 756. In step 756, the test system is operated to measure and record CPU(t) and/or CDWV. Then, in step 758, the test system is operated to apply the incoming session establishment rate indicated by the incoming session rate establishment rate parameter while measuring and recording CPU(t) and/or CDWV. Then, in step 760, the test system is operated to increase the incoming session establishment rate parameter by a value $DELTA_1$, e.g., 1 additional session per second. Operation proceeds from step 760 to step 762.

In step 762, the test system is operated to check if the incoming session rate establishment parameter exceeds a value $MAXRATE_1$, e.g., 1,000 new sessions per second. If $MAXRATE_1$ is not exceeded, operation returns to step 754, and the testing system proceeds to perform another set of measurements at the same pre-existing session rate, but using a new session establishment rate (steps 754, 756, 758). If $MAXRATE_1$ is exceeded, operation proceeds from step 762 to step 764, where the testing system is operated to update the pre-existing session parameter by increasing the pre-existing session parameter by a value $DELTA_2$, e.g., a value of 1,000 pre-existing sessions. Operation proceeds from step 764 to step 766.

In step 766, the test system checks as to whether the value of the pre-existing session parameter exceeds a value $MAXLEVEL_2$, e.g., 100,000 sessions. If the pre-existing session value parameter does not exceed $MAXLEVEL_2$, then operation returns to step 752, to continue with additional measurements conducted with a new number of pre-existing sessions functioning as an input parameter obtained in step 764. However, if in step 766, the pre-existing session parameter is determined to have exceeded $MAXLEVEL_2$, then operation proceeds from step 766 to step 768. In step 768, a module or modules within the testing system are operated to output, e.g., forward, collected information, e.g., control parameters (number of pre-existing sessions, incoming session establishment rate) and corresponding measured results (CPU(t), CDWV), to an analyzer module within the testing system.

An exemplary implementation of sub-step 708 is included in FIG. 7C. The exemplary method of sub-step 708 starts in step 770, where the test system is operated to set a parameter indicating the incoming session establishment rate to an initial value, e.g., 0 new sessions established per second. Operation proceeds from step 770 to step 772. In step 772, the test system is operated to set a parameter indicating a fixed number of concurrent sessions to an initial value, e.g., 0 concurrent sessions. Operation proceeds from step 772 to step 774.

In step 774, the test system is operated to establish and maintain the specified fixed number of concurrent sessions as indicated by the fixed number of concurrent sessions parameter. Operation proceeds from step 774 to step 776. In step 776, the test system is operated to measure and record CPU(t) and/or CDWV. Then, in step 778, the test system is operated to apply the incoming session establishment rate indicated by the incoming session rate establishment parameter while measuring and recording CPU(t) and/or CDWV. Then, in step 780, the test system is operated to increase the fixed number of concurrent sessions parameter by a value $DELTA_3$, e.g., 1,000 concurrent sessions. Operation proceeds from step 780 to step 782.

In step 782, the test system is operated to check if the fixed number of concurrent sessions parameter exceeds a value $MAXLEVEL_3$, e.g., 100,000 concurrent sessions. If $MAXLEVEL_3$ is not exceeded, operation returns to step 784, and the testing system proceeds to perform another set of measurements at a different number of concurrent sessions, but using the same incoming session establishment rate (steps 784, 786, 788). If $MAXLEVEL_3$ is exceeded, operation proceeds from step 782 to step 784, where the testing system is operated to update the incoming session establishment rate parameter by increasing the incoming session establishment rate parameter by a value $DELTA_4$, e.g., 1 session per second. Operation proceeds from step 784 to step 786.

In step 786, the test system checks as to whether the value of the incoming session establishment rate parameter exceeds a value $MAXRATE_4$, e.g., 1,000 sessions per second. If the incoming session establishment rate parameter does not exceed $MAXRATE_4$, then operation returns to step 772, to continue with additional measurements conducted with a new incoming session establishment rate, as obtained in step 784. However, if in step 786, the incoming session establishment rate parameter is determined to have exceeded $MAXRATE_4$, then operation proceeds from step 786 to step 788. In step 788, a module or modules within the testing system are operated to output, e.g., forward, collected information, e.g., control parameters (fixed number of concurrent sessions, incoming session establishment rate) and corresponding measured results (CPU(t), CDWV), to an analyzer module within the testing system.

Operation proceeds from step 704 to step 710. In step 710, the testing system is operated to correlate and analyze the data from step 704. Step 710 includes sub-step 712 and sub-step 714. In sub-step 712, the testing system is operated to perform graphical analysis, e.g., obtaining two and three dimensional plots for review. In sub-step 714, the testing system is operated to perform "data mining" operations, classification, and analysis. In step 710, in addition to the controlled inputs and measured outputs from step 704, the testing system receives and uses inputs 716 and 718. Input 716 is UUT test manufacturer specifications and/or requirements, e.g., CPU time loading performance specifications, closing window delay timing specification, maximum call loading specifications, maximum session initiation and/or session termination specifications, etc. Input 718 is other UUT test results, e.g., corresponding to results obtained on competitors perimeter protection devices and/or different models and/or versions of the same manufacturer.

Various outputs are obtained from step 710 including an efficiency factor or efficiency factor information 720 corresponding to the UUT presently under test, a protocol implementation report 720 identifying protocol stack features that are not compliant with the protocol specification, a correlation report 721 relating at least some of: call rate, number of concurrent calls, CPU loading and/or efficiency, closing delay window of vulnerability (CDWV) for dynamic pinholes, and protocol test suite failed use cases, a pass/fail report 722 identifying as to whether the UUT under test satisfied the advertised manufacturer specifications and/or system requirements including protocol requirements, and a comparison report 724, e.g., comparing the UUT presently under test to other UUTs under consideration, e.g., by a service provider.

Figure 8:
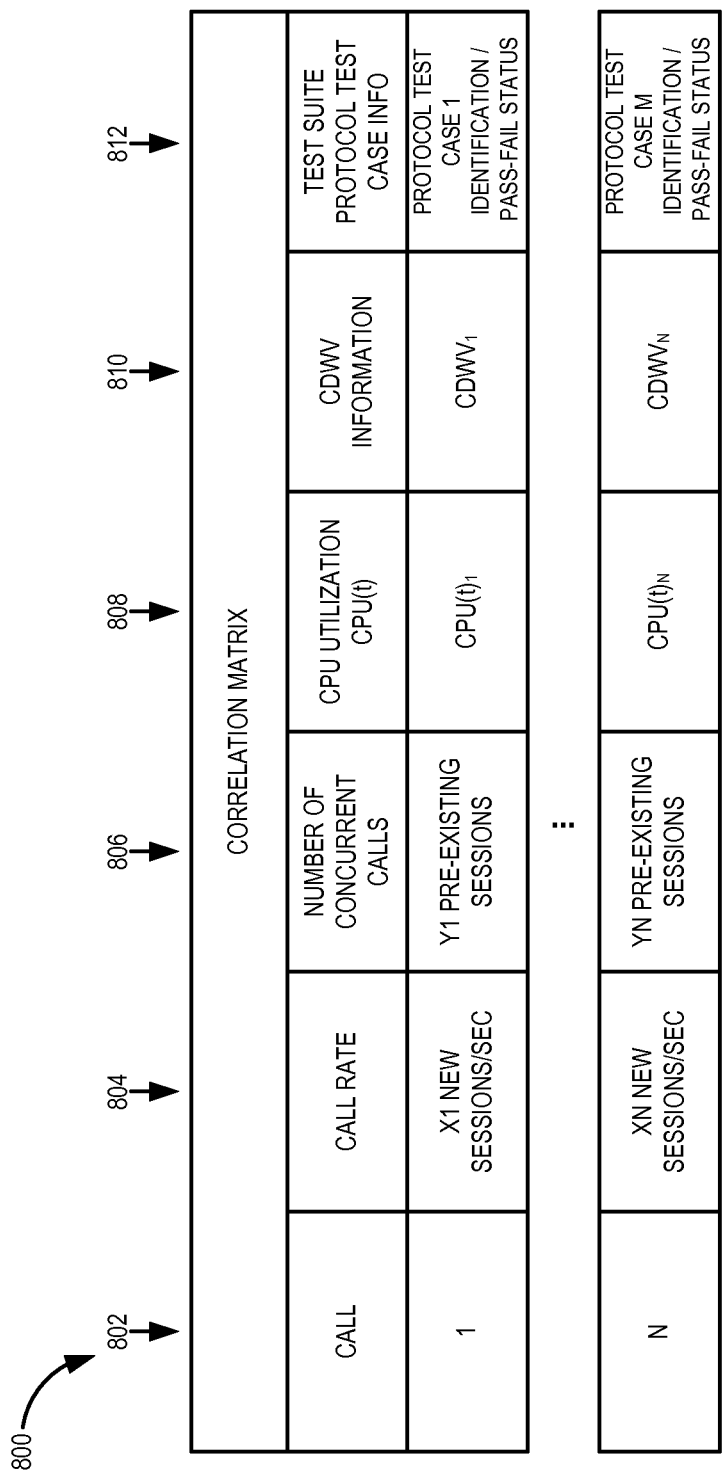
FIG. 8 is a drawing of an exemplary correlation matrix table, in which information corresponding to test control values and test results is stored, in accordance with the present invention.

FIG. 8 is a drawing of an exemplary table 800, in which information corresponding to test control values and test results is stored. Exemplary table 800 is a correlation matrix table. First column 802 identifies individual particular calls for which measurements are taken; second column 804 identifies the call rate; third column 806 identifies the number of concurrent calls; fourth column 810 identifies cpu utilization, cpu(t), e.g., a measure of CPU efficiency and/or CPU loading information; fifth column 812 identifies closing delay window of vulnerability (CDWV) information, sixth column 814 identifies test suite protocol test case information. Test suite protocol test case information, in some embodiments, includes information identifying the particular test suite test case performed and pass/fail status of the test case, e.g., whether the test case results indicated compliance with the protocol standard or whether test case results indicated non-compliance with the protocol standard.

The correlation matrix is useful in identifying deficiencies and stress points in the firewall device under test. The correlation matrix allows a detected anomaly or anomalies, e.g., observable in high cpu(t), high CDWV, and/or detected protocol test case failure, to be correlated with one another and/or to one or more of the controlled inputs, e.g., protocol test case identification, call rate and/or number of concurrent calls. For example, one particular protocol test case may fail irrespective of the call loading conditions, because the vendor's streamlined protocol set intentionally omits a function, e.g., an error reporting function; however, cpu(t) and CDWV may not be adversely impacted by this intentional omission. As another example, another protocol test case, e.g., an encryption test case, may pass under low call rate conditions, but may be observed to fail under high call rate conditions, and when the fail occurs the CDWV may be observed to be unacceptably high. As another example, a protocol test case, e.g., a domain name server (DNS) test case, may pass under low call rate conditions, but may be observed to fail under high call rate conditions, and when the failure occurs the cpu(t) may be observed to be unacceptably high.

The preferred systems and methods described in here may be modified in various ways, as will be apparent to those with technical skill. For example, while described in the context of a local carrier IP network system, the preferred methods and systems are applicable to a wide range of communications systems. Furthermore, the preferred systems and methods have been described with reference to VoIP implementations and associated equipment, however, those of technical skill will recognize that the preferred embodiments may be applied to other session-oriented communications (e.g., video) which may benefit from the use of dynamic pinhole filtering.

In various embodiments elements described herein are implemented using one or more modules to perform the steps corresponding to one or more methods, for example the integrated intelligent end points may include modules for controlling the device to generate traffic for various tests, monitor CPU utilization of a gateway controller implementing a dynamic firewall, generate graphic representations of test results corresponding to one or more routers/firewalls, etc. Such modules may be implemented using software, hardware or a combination of software and hardware. Many of the above described methods or method steps can be implemented using machine executable instructions, such as software, included in a machine readable medium such as a memory device, e.g., RAM, floppy disk, etc. to control a machine, e.g., general purpose computer with or without additional hardware, to implement all or portions of the above described methods, e.g., in one or more nodes. Accordingly, among other things, the preferred embodiments described herein may be implemented in a machine-readable medium including machine executable instructions for causing a machine, e.g., processor and associated hardware which may be part of a test device, to perform one or more of the steps of the above-described method(s).

Numerous additional variations on the preferred methods and systems described above will be apparent to those of technical skill in view of the above description. Such variations are to be considered within the scope of the invention as defined by the appended claims.

What is claimed is:

1. A computer-implemented method comprising:
transmitting a plurality of session signaling loads through a firewall, wherein the firewall is associated with a gateway device implementing a session signaling protocol;
transmitting signals associated with a test signaling sequence through the firewall at a plurality of signaling rates;
monitoring a processor utilization rate or a pinhole closing delay in the firewall to determine one of:
the processor utilization rate for each of the plurality of session signaling loads and signaling rates, or
the pinhole closing delay for each of the plurality of different session signaling loads and signaling rates;
monitoring to detect a failure to maintain compliance with the session signaling protocol implemented by the gateway device for each of the plurality of session signaling loads and signaling rates; and
outputting firewall loading information obtained from the monitoring.

2. The computer-implemented method of claim 1, further comprising:
receiving a test plan that includes the test signaling sequence, the test signaling sequence including:
an incomplete session signaling transaction;
a partial closing of a session;
interactions with a real-time control protocol (RTCP) device;
interactions using a secure communications protocol during session signaling;
a mid session crash;
receipt of a packet missing header information;
interaction with a network address translation (NAT) device;
interaction with a network address protocol translation (NAPT) device;
processing a packet including an encrypted payload; or
a Universal Resource Locator (URL) which will result in Domain Name Server (DNS) lookup failure.

3. The computer-implemented method of claim 1, wherein the test signaling sequence comprises a plurality of test signaling sequences, wherein each of the plurality of test signaling sequences is different.

4. The computer-implemented method of claim 1, wherein transmitting signals associated with the test signaling sequence includes transmitting signals to test for handling of session signaling errors.

5. The computer-implemented method of claim 1, wherein transmitting signals associated with the test signaling sequence at a plurality of signaling rates includes changing, for each of the plurality of session signaling loads, a rate at which sessions through the firewall are initiated or a rate at which sessions through the firewall are terminated.

6. The computer-implemented method of claim 5, wherein the firewall loading information indicates types of failures associated with maintaining compliance with the session signaling protocol for each of the plurality of session signaling loads and signaling rates at which failures are detected.

7. The computer-implemented method of claim 6, wherein the firewall loading information further includes, for each type of failure, session signaling load information indicating the session signaling load, at which the failures are detected and signaling rate information indicating the signaling rate at which the failures are detected.

8. The computer-implemented method of claim 7, further comprising:
identifying a minimum session signaling load at which each type of failure is detected or a minimum signaling rate at which each type of failure is detected.

9. The computer-implemented method of claim 7, further comprising:
displaying a plot indicating, for each type of failure, a number of failures detected for each session signaling load or each signaling rate, wherein the plot further indicates information for multiple types of failures for multiple session signaling loads or multiple signaling rates.

10. The computer-implemented method of claim 9, wherein the plot indicates the processor utilization rate for each session signaling load or each signaling rate for which a failure is indicated.

11. A system comprising:
a network device including:
a transmitter to transmit a plurality of session signaling loads through a firewall, and to transmit signals associated with a test signaling sequence through the firewall at a plurality of signaling rates, wherein the firewall is associated with a gateway device that implements a session signaling protocol;
a processor to determine a processor utilization rate of the firewall for each of the plurality of session signaling loads and signaling rates, or a pinhole closing delay for each of the plurality of different session signaling loads and signaling rates; and
wherein the processor is configured to determine a failure to maintain compliance with the session signaling protocol implemented by the gateway device for each of the plurality of session signaling loads and signaling rates.

12. The system of claim 11, further comprising the firewall.

13. The system of claim 12, further comprising the gateway device that implements the session signaling protocol.

14. The system of claim 13, further comprising another network device coupled to the gateway device, the other network device including a receiver to receive the plurality of session signaling loads or the signals associated with the test signaling sequence at a plurality of signaling rates.

15. The system of claim 11, wherein the network device further includes:
a memory to store a test plan, the test plan including the test signaling sequence, the test signaling sequence including:
an incomplete session signaling transaction;
a partial closing of a session;
interactions with a real-time control protocol (RTCP) device;
interactions using a secure communications protocol during session signaling;
a mid session crash;
receipt of a packet missing header information;
interaction with a network address translation (NAT) device;
interaction with a network address protocol translation (NAPT) device;
processing a packet including an encrypted payload; or a Universal Resource Locator (URL) which will result in Domain Name Server (DNS) lookup failure.

16. The system of claim 15, wherein the memory of the network device is configured to store firewall loading information including the failures determined by the processor.

17. The system of claim 11, wherein the test signaling sequence comprises a plurality of test signaling sequences, wherein each test signaling sequence is different.

18. The system of claim 11, wherein the test signaling sequence tests for compliance with the session signaling protocol including handling of session signaling errors.

19. The system of claim 11, wherein processor of the network device is configured to control the transmitter to transmit the signals associated with the plurality of signaling rates by changing a rate at which sessions through the firewall are initiated or a rate at which sessions through the firewall are terminated.

20. The system of claim 19, further comprising a memory to store firewall loading information, wherein the firewall loading information indicates types of failures to maintain compliance with the session signaling protocol for each of the plurality of session signaling loads at which failures are detected or each of the plurality of signaling rates at which failures are detected.

* * * * *